(12) United States Patent
Allinger et al.

(10) Patent No.: US 11,459,050 B2
(45) Date of Patent: Oct. 4, 2022

(54) CONNECTED COMPONENT PLATFORM

(71) Applicant: Fox Factory, Inc., Duluth, GA (US)

(72) Inventors: Wesley E. Allinger, Santa Cruz, CA (US); Paul W. Stecher, Braselton, GA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/388,401

(22) Filed: Jul. 29, 2021

(65) Prior Publication Data
US 2021/0387690 A1 Dec. 16, 2021

Related U.S. Application Data

(63) Continuation-in-part of application No. 17/011,228, filed on Sep. 3, 2020.

(60) Provisional application No. 63/051,771, filed on Jul. 14, 2020, provisional application No. 63/041,298, filed on Jun. 19, 2020, provisional application No. 62/895,434, filed on Sep. 3, 2019.

(51) Int. Cl.
| | |
|---|---|
| *B62J 45/20* | (2020.01) |
| *G07C 5/06* | (2006.01) |
| *B62K 25/00* | (2006.01) |
| *B62J 50/22* | (2020.01) |
| *B62J 45/41* | (2020.01) |
| *G07C 5/08* | (2006.01) |
| *G07C 5/00* | (2006.01) |
| *B62J 45/416* | (2020.01) |

(52) U.S. Cl.
CPC .......... *B62J 45/20* (2020.02); *B62J 45/416* (2020.02); *B62J 50/22* (2020.02); *B62K 25/00* (2013.01); *G07C 5/006* (2013.01); *G07C 5/0825* (2013.01)

(58) Field of Classification Search
CPC .......... B62J 45/20; B62J 45/416; B62J 50/22; B62K 25/00; G07C 5/006; G07C 5/0825
See application file for complete search history.

(56) References Cited

U.S. PATENT DOCUMENTS

| | | |
|---|---|---|
| 3,986,118 A | 10/1976 | Madigan |
| 4,773,671 A | 9/1988 | Inagaki |
| 4,984,819 A | 1/1991 | Kakizaki et al. |
| 5,027,303 A | 6/1991 | Witte |

(Continued)

FOREIGN PATENT DOCUMENTS

| | | |
|---|---|---|
| JP | 2015093671 A | 5/2015 |
| JP | 2019018587 A | 2/2019 |

OTHER PUBLICATIONS

Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.

(Continued)

*Primary Examiner* — Tyler J Lee

(57) ABSTRACT

A connected component platform (CCP) is disclosed. The CCP receives information about at least one connected component on a vehicle and sensor derived performance information for the vehicle. The CCP develops a suspension setup recommendation for the vehicle based on the information about the at least one connected component and the sensor derived performance information. The suspension setup recommendation for the vehicle is presented on a display.

21 Claims, 10 Drawing Sheets

(56) References Cited

U.S. PATENT DOCUMENTS

| | | | |
|---|---|---|---|
| 5,105,918 A | 4/1992 | Hagiwara et al. | |
| 5,390,949 A | 2/1995 | Naganathan et al. | |
| 5,952,823 A | 9/1999 | Sprecher et al. | |
| 6,244,398 B1 | 6/2001 | Girvin et al. | |
| 6,427,812 B2 | 8/2002 | Crawley et al. | |
| 6,627,932 B1 | 9/2003 | Drewes | |
| 6,857,580 B2 | 2/2005 | Walter | |
| 6,863,291 B2 | 3/2005 | Miyoshi | |
| 6,935,157 B2 | 8/2005 | Miller | |
| 7,374,028 B2 | 5/2008 | Fox | |
| 8,738,212 B1 * | 5/2014 | Schieffelin | H04W 4/027 180/205.1 |
| 9,033,122 B2 | 5/2015 | Ericksen et al. | |
| 9,120,362 B2 | 9/2015 | Marking | |
| 9,239,090 B2 | 1/2016 | Marking et al. | |
| 9,353,818 B2 | 5/2016 | Marking | |
| 9,656,672 B2 * | 5/2017 | Schieffelin | B60W 10/11 |
| 10,036,443 B2 * | 7/2018 | Galasso | B62K 25/286 |
| 10,189,535 B1 * | 1/2019 | Arnott | B62K 11/14 |
| 10,358,133 B2 * | 7/2019 | Schieffelin | F16D 41/24 |
| 2011/0202236 A1 * | 8/2011 | Galasso | B62K 25/04 701/37 |
| 2012/0166044 A1 | 6/2012 | Battlogg et al. | |
| 2014/0032042 A1 * | 1/2014 | Taniguchi | B62J 50/22 701/36 |
| 2017/0106866 A1 * | 4/2017 | Schieffelin | B60W 10/11 |
| 2017/0282919 A1 * | 10/2017 | Schieffelin | B60W 30/181 |
| 2017/0334500 A1 * | 11/2017 | Jarek | B60R 16/02 |
| 2018/0304952 A1 | 10/2018 | Krugman et al. | |
| 2018/0328442 A1 * | 11/2018 | Galasso | F16F 9/3264 |
| 2020/0309229 A1 * | 10/2020 | Galasso | B62K 25/04 188/266 |

OTHER PUBLICATIONS

ISA/KR, International Search Report and Written Opinion for International Application No. PCT/US2020/049236, dated Nov. 30, 2020, 12 Pages.

ISA/KR, International Preliminary Report on Patentability for International Application No. PCT/US2020/049236, dated Mar. 17, 2022, 8 Pages.

* cited by examiner

CONNECTED COMPONENT PLATFORM

CROSS REFERENCE TO RELATED APPLICATIONS (PROVISIONAL)

This Application is a continuation-in-part, and claims priority to and benefit of, co-pending U.S. patent application Ser. No. 17/011,228 filed on Sep. 3, 2020, entitled "Connected Component Platform" by Allinger et al., and assigned to the assignee of the present application, the disclosure of which is hereby incorporated by reference in its entirety.

U.S. patent application Ser. No. 17/011,228 claims priority to and benefit of U.S. Provisional Patent Application No. 62/895,434 filed on Sep. 3, 2019, entitled "Connected Component Platform" by Allinger et al., and assigned to the assignee of the present application, the disclosure of which is hereby incorporated by reference in its entirety.

U.S. patent application Ser. No. 17/011,228 claims priority to and benefit of U.S. Provisional Patent Application No. 63/041,298 filed on Jun. 19, 2020, entitled "Connected Component Platform" by Allinger et al., and assigned to the assignee of the present application, the disclosure of which is hereby incorporated by reference in its entirety.

U.S. patent application Ser. No. 17/011,228 claims priority to and benefit of U.S. Provisional Patent Application No. 63/051,771 filed on Jul. 14, 2020, entitled "Connected Component Platform" by Allinger et al., and assigned to the assignee of the present application, the disclosure of which is hereby incorporated by reference in its entirety.

FIELD OF THE INVENTION

Embodiments of the invention generally relate to methods and apparatus for use in vehicle component connectivity and suspension performance evaluation.

BACKGROUND OF THE INVENTION

Vehicle and their components are used to provide for a comfortable ride, enhance performance, and the like. However, a rider/driver may not obtain the best performance from a vehicle for a number of reasons, such as a result of vehicle (or its components) settings at a level that is better than the rider/driver's skill, rider/driver's skill surpassing the vehicle (or its components) capabilities or settings, rider/driver's skill increasing and surpassing the vehicle (or its components) capabilities or settings, or a combination thereof. Thus, the ability to obtain good, great, or even the best vehicle performance can depend on one or more of the component settings/operation, on the terrain type, or any almost infinite number of component settings, component interactions, etc.

Figure 1A:
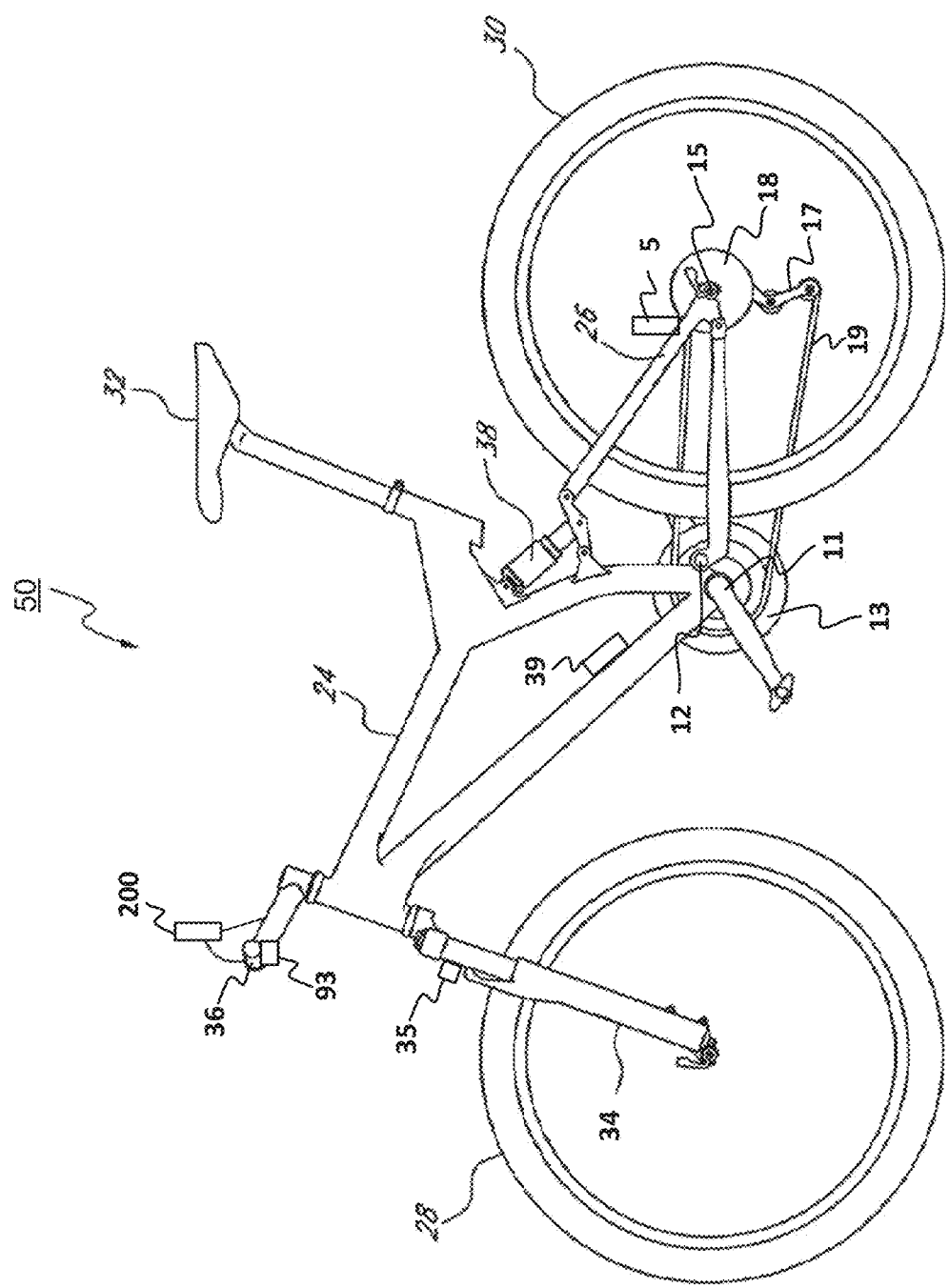
FIG. 1A is a line diagram side view of a bicycle, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Overview

The FOX™ connected component platform (hereinafter FCCP) is used to enhance the riding experience of all vehicle users, e.g., novice, intermediate, and professional. In one embodiment, FCCP provides for the collection of static data, dynamic data, and real-time sensor derived data from various sources. The FCCP further evaluates the data in view of user specific, vehicle specific, and/or component specific features and characteristics and generates user evaluation data. The FCCP then presents the user evaluation data in a novel way to a user's computer system, mobile device, web service, Internet accessible page, via an application, or the like. The user evaluation data facilitates the optimal use of the suspension by recommending suspension adjustments, affirming current suspension settings, and recommending suspension maintenance activities ultimately resulting in a more enjoyable riding or driving experience.

In addition, the FCCP provides a novel approach for incorporating actual rider characteristics and bike specifications/features, with location information, manufacturer suggested operation envelops, other rider's settings, and actual performance evaluations to provide a rider with a setup that would previously only have been available to a professional rider, team rider, etc.

In other words, by using the FCCP, any rider will be able to obtain a professional, personally customized set-up and settings configuration information that is based on the actual rider, the actual vehicle being used, the actual components on the vehicle, and the use of specific adjustment inputs based on an actual riding location and the actual real-time (or near real-time) environmental conditions. Further, in one embodiment, the settings and performance settings, suggestions, and feedback are consistently updated.

In one embodiment, and based on the sensor information obtained by the sensors during the ride, the rider will not only receive personalized settings from the FCCP, but will also receive "personalized riding coach" riding tips and performance enhancing suggestions.

For example, the FCCP would review the sensor data (along with the actual bike's actual performance characteristics and capabilities). Using this information, the "riding coach" FCCP would be able to evaluate the rider's personal performance along with the actual performance of one or more of the connected components on the vehicle. This would allow the FCCP to determine if the rider is obtaining the maximum performance from a component, if the component needs maintenance, if it is time for preventative maintenance, replacement, etc. For example, in evaluating the rider's personal performance, the FCCP would be able to evaluate a ride (or a portion of a ride) to determine where the rider could have pushed harder, shifted to a different (lower or higher) gear, used different (harder or softer) damper settings, or the like.

Similarly, the FCCP would be able to complement a rider on their personal performance aspects (e.g., "your downhill was in the top 25% of all recorded users (or a set of designated users, or a collection of the rider's own rides, etc.)). The FCCP could also suggest replacement components where the suggestion could be tailored by best performance gains, best bang-for-buck, best component based on other existing components, etc. Thus, the rider would not simply be provided with a purchase offer, but the rider would be provided with a customized, individualized, and specific component(s) guide that is matched to the rider's individual riding style, body type, skill level, etc. Thus, instead of selecting in the dark, using online forums, bike shops, or the like; the rider would be provided with a number of specifications (or actual brand components) that would meet the rider's personal criteria. For example, a 150 lb rider looking for a replacement fork would be provided with one or more fork options that are taken from the actual rider and rider style specifications; e.g., a 140-160 lbs rider weight, strong (or lightweight or combination), terrain type (e.g., road, dirt, gravel, mountain terrain), environment (e.g., sandy, day, water, mud, dry), amount of use, etc.

Because of the growing capabilities of connected components, active suspension systems, and sensor generated feedback; the ability to provide a rider with a personalized professional level of support, settings, maintenance, and guidance is at a previously untenable level. What would have previously required a team of experts is now capable of being provided by the FCCP.

In one embodiment, the computing system running the FCCP application and the different smart capabilities of the active suspension system utilize more or less of the data from the different data sources (instead of all of the myriads of sensor, rider, vehicle, terrain, environment, data) to generate and define the results, settings, evaluations, and conclusions. In so doing, instead of using, evaluating, and implementing the data, settings, and setup using the limited computing resources and battery power of the suspension controller, the device (or devices) running the FCCP disseminate an amount of processing based on different components computing capabilities, energy requirements, etc. For example, the FCCP allows the users laptop (desktop, notebook, mobile device, or other higher processing/storage/energy computing system) to do a lot of the processing while providing only light processing requirements to be performed by the battery powered controller. Thereby refining the overall computer processing and data storage capability, while reducing processor usage, energy requirements, memory requirements, and the like.

For example, by generating a tune (with a number of predefined parameters), the processing, storage, and battery requirements of one or more of the active suspension components (including the suspension controller) are reduced. For example, the tune includes a number of parameters with a number of thresholds. In the case of a bump, the tune defines a magnitude that can differ based on terrain (e.g., paved road low magnitude—e.g., 2 cm bump; gravel road medium magnitude—e.g., 5 cm bump; etc.). Thus, the sensor information is evaluated for the size of the bump on the given surface and when it exceeds the threshold (as defined by the tune stored in the controller), the change is automatically made (e.g., hard to soft suspension setting, or the like). As such, the processing requirements for the suspension controller portion of the active suspension are supported by the user's mobile device running the FCCP application (for example). In so doing, the battery usage of the suspension controller and other smart systems of the active suspension are reduced from an entire evaluation of all real-time sensor information, terrain information, etc. (which is now being performed by the FCCP), to the significantly less computer intensive bump threshold evaluation.

By reducing the processing requirements of battery supported components, the operational time for the active suspension system between charges can be increased, the weight of one or more of the active suspension system components can be decreased, and the overall user enjoyment is maintained (or enhanced) since the active suspension system is not running out of charge halfway through a ride—but instead remains fully functional during an entire ride, day of riding, etc.

In the following discussion, the term "active", as used when referring to a valve or damping component, means adjustable, manipulatable, etc., during typical operation of the valve. For example, an active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding damping characteristics, based upon, for example, operational information pertaining to the vehicle and/or the suspension with which the valve is used. Similarly, it will be understood that in some embodiments, an active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension").

In a conventional "fully active suspension", a motive source such as, for example, an actuator, is used to move (e.g., raise or lower) a wheel with respect to the vehicle. In a "semi-active suspension", no motive force/actuator is employed to move (e.g. raise or lower) a wheel with respect to the vehicle. Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to move (e.g. raise or lower) a wheel with respect to the vehicle. As such, it will be understood that an "active valve", as defined above, is well suited for use in a "fully active suspension" or a "semi-active suspension".

In the following discussion, the term ride height refers to a distance between a portion of a vehicle and the surface across which the vehicle is traversing. Often, ride height is based on one or more of a number of different measurements such as, but not limited to, a distance between a part of the vehicle and the ground, a measurement between the top of an unsprung portion of a vehicle and a suspended portion of the vehicle there above, etc. For example, a portion of the wheel(s) (or ski, track, hull, etc.) will be in contact with the surface, while one or more shock assemblies and/or suspension components maintain the suspended portion of the vehicle a certain height there above.

In one embodiment using a wheeled vehicle example, a portion of the wheel will be in contact with the surface while a shock assembly and/or other suspension components will be coupled between a wheel retaining assembly and the suspended portion of the vehicle (often a portion of the vehicle frame). The ride height is established by the geometries of the shock assembly and/or other suspension components, the wheel retaining assembly, the wheel and tire profile, and the like.

Similarly, in a snow machine, a portion of the track (and similarly the skis) will be in contact with the surface while a shock assembly and/or other suspension components will be coupled between a track retaining assembly (and similarly the skis retaining assembly) and the suspended portion of the vehicle (often a portion of the vehicle frame). Here again, the ride height is established by the geometries of the shock assembly and/or other suspension components, the track and ski retaining assemblies, the track and/or ski profile, and the like.

In one embodiment, such as a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like). Here again, the ride height is established by the geometries of the shock assembly and/or other suspension components, with respect to the hull and the suspended portion(s) of the vehicle.

In the following discussion, the term initial SAG settings or "SAG" refers to a predefined vehicle ride height and suspension geometry based on the initial compression of one or more shock assemblies of the suspension system for a given vehicle when it is within its normal load envelope configuration (e.g., with a rider/driver and any initial load weight). Once the SAG is established for a vehicle, it will be the designated ride height of the vehicle, until and unless the SAG is changed.

The initial SAG for a vehicle is usually established by the manufacturer. The vehicle SAG can then be modified and/or adjusted by an owner, a mechanic, or the like. For example, an owner can modify the SAG to designate a new normal ride height based on a vehicle use purpose, load requirements that are different than the factory load configuration, an adjustment modification and/or replacement of one or more of the suspension components, a change in tire size, a performance adjustment, aesthetics, and the like.

For example, an unloaded motorcycle may have an initially assembled suspension ride height ranging from 30-38 inches from ground to saddle. The manufacturer will then set the manufacturer initial SAG for the vehicle based on a use category, a user weight/height range, the performance envelope, and the like.

In one embodiment, for example, the manufacturer could set the SAG for a 34-inch ride height (a middle of the performance envelope) based on a rider with a weight of 150 lbs. This would mean that unencumbered, the motorcycle would have a seat height that was higher than 34-inches of ride height (such as for example, a seat height of 38 inches). However, when a 150 lb. rider sits on the motorcycle, the suspension would compress and the motorcycle would be at the SAG ride height of 34-inches.

In one embodiment, an owner (or agent of the owner such as a mechanic, friend, shop, or the like) will modify the initial SAG to designate an owner specific SAG. For example, if the user wanted to have a lower ride height, they could adjust, modify, and/or replace one or more of the suspension components to reduce the SAG to 32-inches. In contrast, if the user wanted a higher ride height, they could adjust, modify, and/or replace one or more of the suspension components to increase the SAG to 36-inches.

In one embodiment, the owner could adjust, modify, and/or replace one or more of the suspension components to achieve the manufactures initial SAG. For example, if the rider weighed 250 lbs., when the rider sat on the motorcycle configured for a 150 lb. rider, the ride height would be lower than the 34-inch SAG. As such, the rider would adjust, modify, and/or replace, one or more of the suspension components to return the motorcycle to the 34-inch SAG.

In one embodiment, the initial manufacturer will use SAG settings resulting in a pre-established vehicle ride height based on vehicle use, size, passenger capacity, load capacity, and the like. For example, a truck (side-by-side, car, or the like) may have a pre-established SAG based on an expected load (e.g., a number of passengers, an expected cargo requirement, etc.).

Regardless of the vehicle type, once the SAG is established, in a static situation the ride height of the expectedly loaded vehicle should be at or about the established SAG. When in motion, the ride height will change as the vehicle travels over the surface, and while the suspension system is used to reduce the transference of any input forces received from the surface to the rest of the vehicle it is also used to maintain the vehicle's SAG.

However, when additional weight is added to the vehicle, the suspension and one or more shock assemblies will be compressed, and the vehicle ride height will be less than the SAG.

For example, if a vehicle such as a snow machine, motorcycle, or bicycle is loaded with an additional 100 lbs. of cargo in the rear, the extra 100-pound load will cause shock assembly compression (and the like) thereby causing the vehicle to ride lower in the rear. In general, this lower rear ride height will move the vehicle out of SAG and change the vehicle geometry, e.g., cause a slant upward from rear to front. Often, an out of SAG condition is visually identifiable and in this particular example can result in lightness in steering, rear suspension bottom out, and the like.

In one embodiment, for example in a side-by side that is loaded with 250 lbs. of additional weight, the additional weight will reduce the available operating length of one or more suspension components which can be detrimental to steering and performance characteristics, could cause an unwanted impact between wheel (or wheel suspension) and frame, increase the roughness of the ride, increase suspension stiffness, result in suspension bottom out, loss of control, tire blow out, and the like.

In one embodiment, for example in a truck that is loaded with 500 lbs. of additional weight, when the weight is added to the vehicle, if it is not centered, it will not only cause a change in the front or rear SAG (depending upon the load location fore or aft), but will also cause SAG changes that will differ between the left and right side of the vehicle. For example, if the load is in the rear and off-center to the left, the load-modified ride-height of the vehicle will be lopsided. That is, not only will the rear of the vehicle be lower than the front, but the left-side suspension will also be compressed more than the right-side suspension causing the rear left of the vehicle to have a lower ride-height than the other three corners.

Thus, while the entire rear of the vehicle will be out of SAG and therefore riding lower than the front of the vehicle, it will also be lopsided between the left and right sides. Such lopsided suspension characteristics can be extremely deleterious while driving and will often result in a number of deleterious issues including, but not limited to: steering problems, suspension bottom out, loss of control, tire blow-out, and vehicle rollover.

In contrast to the examples above, when the weight added to the vehicle (e.g., rider, passengers, cargo, etc.) is less than the expectedly loaded vehicle weight, the suspension and one or more shock assemblies will be less compressed, and the vehicle ride height will be higher than the SAG. This lighter loaded situation can also result in a number of deleterious issues including, but not limited to: improper seat height (e.g., a rider will be higher off the ground than expected), change in vehicle height clearance, suspension top-out, suspension issues caused by the vehicle operating outside of the operating envelope for the suspension, and the like.

Additional information regarding SAG and SAG setup can be found in U.S. Pat. No. 8,838,335 which is incorporated by reference herein, in its entirety.

In the following discussion, and for purposes of clarity, a bicycle is utilized as the example vehicle. However, in another embodiment, the vehicle could be on any one of a variety of vehicles that utilize active valve dampers such as, but not limited to, a bicycle, a motorized bicycle, a motorcycle, a watercraft (e.g., boat, jet ski, PWC, etc.), a snow machine, a single wheeled vehicle, a multi-wheeled vehicle, a side-by-side, an on- and/or off-road vehicle, or the like. In general, a motorized bike can include a bike with a combustion motor, an electric bike (e-bike), a hybrid electric and combustion bike, a hybrid motor and pedal powered bike, and the like.

Operation

In one embodiment, the disclosed system uses one or more sensor to essentially read the terrain. The goal is to discern if the vehicle is experiencing bumpy or smooth terrain and then change one or more suspension characteristics accordingly. For example, in one embodiment, on smooth terrain the suspension is in a firmer mode, while in bumpy terrain the suspension is in a softer mode. In one embodiment, the active adjustment of suspension characteristics is accomplished using aspects such as when the sensor's signal exceeds a configurable threshold, the active valve system opens solenoids in the rear shock and/or front fork, putting one or both in soft mode. After a configurable period of time (e.g., 500 ms) where no further bumps are detected, the shock and/or fork return to firm mode.

FIG. 1A is a schematic side view of a bicycle 50 in accordance with an embodiment. Although a bicycle 50 is used in the discussion. In one embodiment, the vehicle could be a different vehicle such as an e-bike, a motorcycle, ATV, jet ski, car, snow mobile, side-by-side, watercraft, and the like.

Bicycle 50 has a frame 24 with a suspension system comprising a swing arm 26 that, in use, is able to move relative to the rest of frame 24; this movement is permitted by, inter alia, active valve damper 38. The front forks 34 also provide a suspension function via a damping assembly in at least one fork leg; as such the bicycle 50 is a full suspension bicycle (such as an ATB or mountain bike). However, the embodiments described herein are not limited to use on full suspension bicycles. Instead, the following discussion is intended to include vehicles having front suspension only, rear suspension only, seat suspension only, other components with a damper of some type, a combination of two or more different suspensions, and the like.

In one embodiment, swing arm 26 is pivotally attached to the frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. The use of the location of pivot point 12 herein is provided as one embodiment of the location. Bottom bracket axis 11 is the center of the pedal and front sprocket assembly 13. Bicycle 50 includes a front wheel 28 which is coupled to the frame 24 via front fork 34 and a rear wheel 30 which is coupled to the frame 24 via swing arm 26. A seat 32 is connected to the frame 24 (in one embodiment via a seatpost) in order to support a rider of the bicycle 50.

The front wheel 28 is supported by a front fork 34 which, in turn, is secured to the frame 24 by a handlebar assembly 36. The rear wheel 30 is connected to the swing arm 26 at rear axle 15. Active valve damper 38 is positioned between the swing arm 26 and the frame 24 to provide resistance to the pivoting motion of the swing arm 26 about pivot point 12. Thus, the illustrated bicycle 50 includes a suspension member between swing arm 26 and the frame 24 which operate to substantially reduce rear wheel 30 impact forces from being transmitted to the rider of the bicycle 50.

Bicycle 50 is driven by a chain 19 that is coupled with both front sprocket assembly 13 and rear sprocket 18. As the rider pedals the front sprocket assembly 13 is rotated about bottom bracket axis 11 a force is applied to chain 19 which transfers the energy to rear sprocket 18. Chain tension device 17 provides a variable amount of tension on chain 19.

In one embodiment, bicycle 50 includes one or more sensors, connected components, or the like for sensing changes of terrain, bicycle 50 pitch, roll, yaw, speed, acceleration, deceleration, or the like. For example, in one embodiment, a sensor 5 is positioned proximate the rear axle 15 of bicycle 50. In another embodiment, a sensor 35 is positioned proximate to front fork 34. In yet another embodiment, both sensor 5 and sensor 35 are on bicycle 50.

In one embodiment, the angular orientation of the one or more sensors is movable through a given range, thereby allowing alteration of a force component sensed by the sensor in relation to a force (vector) input. In one embodiment, the value for the range is approximately 120°. In one embodiment, the value for the range is approximately 100°. It is understood that the sensor can be moved or mounted in any suitable configuration and allowing for any suitable range of adjustment as may be desirable. That is useful for adjusting the sensitivity of the sensor to various anticipated terrain and bicycle speed conditions (e.g., the bicycle speed affects the vector magnitude of a force input to the bicycle wheel for constant amplitude terrain disparity or "bump/dip." Varying size bumps and dips also affect the vector input angle to the wheel for constant bicycle speed).

In one embodiment, bicycle 50 includes a switch 93. In general, switch 93 is a positional switch used in conjunction with the active valve suspension discussed in further detail herein. In one embodiment, switch 93 is a multi-positional switch, an upshift/downshift type of switch, a button type switch, or the like. For example, switch 93 would be a 2-position switch, a 3-position switch, a switch that can cycle through a number of different active valve suspension tunes (similar to a gear shift), or the like.

In one embodiment, switch 93 is wireless. For example, switch 93 would communicate with the mobile device 200 (or other components) via Bluetooth, NFC, WiFi, a hotspot, a cellular network, or any other type of wireless communications.

In one embodiment, switch 93 could be wired and could communicate with mobile device 200 by way of an input port such as USB, micro USB, or any other connectable wired configuration that will allow switch 93 to be communicatively coupled with mobile device 200. In one embodiment, switch 93 could have both wired and wireless communication capabilities.

Although switch 93 is shown mounted to handlebar assembly 36, it should be appreciated that switch 93 could be mounted in a different location on the vehicle, on a mount coupled to the vehicle, or the like. in one embodiment, the location of switch 93 is modifiable and is located on the vehicle based on a rider's preference.

Figure 1B:
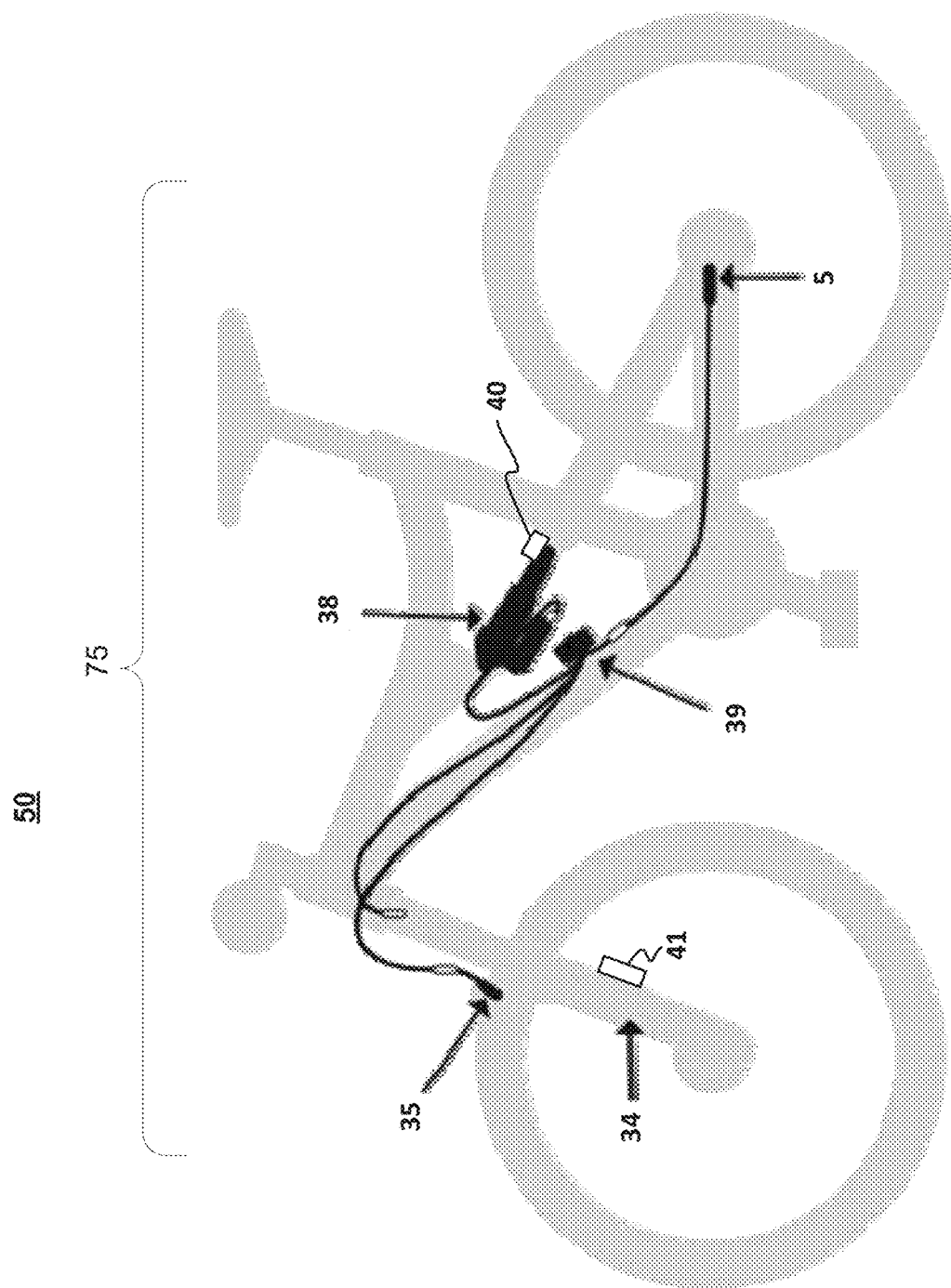
FIG. 1B is a line diagram side view of an active valve system on the bicycle of FIG. 1A, in accordance with an embodiment.

Referring now to FIG. 1B, a line drawing of a side view of an active valve system 75 on bicycle 50 having one or more sensors is shown in accordance with one embodiment. In one embodiment, the one or more sensors provide the obtained sensor data to suspension controller 39 which uses the sensor data to monitor the terrain and make suspension adjustments (to active valve damper 38, an active damper in front fork 34, and/or any other active suspension components of the vehicle). In one embodiment, active valve system 75 is equipped with pitch detection, that can recognize when bicycle 50 is climbing, traversing or descending. In one embodiment, controller 39 includes a lithium ion battery as the main user interface and can be charged (e.g., via micro USB) on or off the bicycle 50.

In one embodiment, suspension controller 39 monitors the terrain at a rate of a thousand times per second and make suspension adjustments in a matter of milliseconds. For example, in one embodiment, sensors on the fork, rear axle, and/or main frame read bump input at the wheel and the pitch angle of the bicycle 50, and send the obtained sensor data to the suspension controller 39 at a rate, such as but not limited to, 1,000 times per second. Thus, by placing sensors on the frame and/or proximate both wheels, the suspension controller 39 processes data from the terrain to constantly adjust the suspension for maximum efficiency and control. In one embodiment, suspension controller 39 includes a lithium ion battery as the main user interface and can be charged (e.g., via micro USB) on or off the bicycle 50.

In general, one or more sensors are used for sensing characteristics (or changes to characteristics) such as terrain, environment, temperature, vehicle speed, vehicle pitch, vehicle roll, vehicle yaw, component activity, or the like. It is understood that the one or more sensors may be imbedded, moved, mounted, or the like, in any suitable configuration and allowing for any suitable range of adjustment as may be desirable.

The one or more sensors may be any suitable force or acceleration transducer (e.g. strain gage, wheatstone bridge, accelerometer, hydraulic, interferometer based, optical, thermal, infrared emitter and receiver, time of flight sensor, LiDar based measurement, hall effect sensor, or any suitable combination thereof). The sensors may utilize solid state electronics, electro-mechanical principles or MEMS, or any other suitable mechanisms. In one embodiment, the sensor comprises a single axis self-powered accelerometer, such as for example ENDEVCO® model 2229C. The 2229C is a comparatively small device with overall dimensions of approximately 15 mm height by 10 mm diameter, and weighs 4.9 g. Its power is self-generated and therefore the total power requirements for the bicycle 50 are reduced; this is an advantage, at least for some types of bicycles, where overall weight is a concern. An alternative single axis accelerometer is the ENDEVCO® 12M1A, which is of the surface-mount type. The 12M1A is a single axis accelerometer comprising a bimorph sending element which operates in the bender mode. This accelerometer is particularly small and light, measuring about 4.5 mm by 3.8 mm by 0.85 mm, and weighs 0.12 g. In one embodiment, the sensor may be a triaxial accelerometer such as the ENDEVCO® 67-100. This device has overall dimensions of about 23 mm length and 15 mm width, and weighs 14 g.

In one embodiment, sensor 41 (or any/all of the recited sensors) is a measurement type sensor such as an infrared based time of flight sensor and the like. In one embodiment, the measurement type sensor continuously and/or repeatedly measures a distance from the bicycle fork steerer tube, crown, or other fixed point to the lower stanchion, wheel, fender, ground or other fixed point. By monitoring the distance between these points, the measurement type sensor can determine the suspension travel used and the speed at which the bicycle fork suspension compressed and rebounded. The time of flight sensor is a STMicroelectronics sensor and specifically STMicroelectronics sensor model VL53L0X.

In one embodiment, sensor 41 (or any/all of the recited sensors) is a measurement type sensor such as a hall effect sensor and the like. In one embodiment, the measurement type sensor continuously and/or repeatedly measures a distance from the bicycle fork steerer tube, crown, or other fixed point to the lower stanchion, wheel, fender, ground or other fixed point. By monitoring the distance between these points, the measurement type sensor can determine the suspension travel used and the speed at which the bicycle fork suspension compressed and rebounded. The hall effect sensor is an Allegro Micro Systems sensor and specifically Allegro Micro Systems sensor model A1454.

In one embodiment, sensor 40 (or any/all of the recited sensors) is a measurement type sensor such as an infrared based time of flight sensor and the like. In one embodiment, the measurement type sensor continuously and/or repeatedly measures a distance from the from the bottom shock eyelet, supporting shock substructure, or other fixed point to the top shock eyelet, supporting substructure, or other fixed point. By monitoring the distance between these points, the measurement type sensor can determine the shock suspension travel used and the speed at which the shock suspension compressed and rebounded. In one embodiment, the time of flight sensor is a STMicroelectronics sensor model VL53L0X.

In one embodiment, sensor 40 (or any/all of the recited sensors) is a measurement type sensor such as a hall effect sensor and the like. In one embodiment, the measurement type sensor continuously and/or repeatedly measures a distance from the from the bottom shock eyelet, supporting shock substructure, or other fixed point to the top shock eyelet, supporting substructure, or other fixed point. By monitoring the distance between these points, the measurement type sensor can determine the shock suspension travel used and the speed at which the shock suspension compressed and rebounded. The hall effect sensor is an Allegro Micro Systems sensor and specifically Allegro Micro Systems sensor model A1454.

In one embodiment, sensor 5 and/or sensor 35 is a measurement type sensor such as radar, 2D and 3D imagers, ultrasonic sensor, photoelectric sensors, LiDar, and the like. In one embodiment, the measurement type sensor continuously and/or repeatedly measures a distance from the sensor to the ground. By monitoring the distance from the sensor to the ground, the measurement type sensor can determine the existence of an upcoming obstacle (e.g., height changes due to holes, bumps, or other obstacles), a shape or abruptness of the obstacle, etc.

For example, in one embodiment, the sensor could be aimed at a point that is approximately 2 feet in front of the bike. In general, by repeatedly measuring the distance from the sensor to the ground in front of the vehicle, any changes in that distance are indicative of an upcoming obstacle.

Although a distance of 2 feet is used in one embodiment, in another embodiment, the distance to the point in front of the bike varies depending upon speed, terrain, and the like. For example, in one embodiment, the distance in front of the bike is defined by user option, factory guidance provided by the damper manufacturer, sensor manufacturer, bike manufacturer, damping system controller manufacturer, or the like. In one embodiment, sensor 5 and/or sensor 35 is a time of flight sensor. In one embodiment, the time of flight sensor is a STMicroelectronics sensor model VL53L0X.

In general, a time of flight sensor is used to measure distances by projecting a laser light and measuring the reflection. Differences in laser return times and wavelengths are used to provide distance measurement information. For example, the time of flight sensor mounted on the vehicle is used to measure the distance to the ground in front of the vehicle. In so doing, the time of flight sensor will provide distance data that is used to monitor and detect terrain changes.

For example, in operation on a steady surface, the sensor will regularly obtain a time-of-flight of x (plus or minus some nominal value depending upon the type of surface, type of vehicle, the precision/tolerance of the sensor, user or system defined tolerance, or the like). For example, in one embodiment, if a bike with a very tight suspension setup (such as a road bike), is being ridden on a paved road, the nominal value would be slight (e.g., less than a ¼") such that a change in measurement (e.g., a ½" deep pothole) would be larger than the nominal value. In contrast, in one embodiment, if a bike with a suspension setup that is not as tight as the road bike (such as a gravel bike) is being ridden on the road, the nominal value could be larger (e.g., less than 1") such that the change in measurement (e.g., a ½" deep pothole) would not be larger than the nominal value. Furthermore, in one embodiment, if a bike with a longer suspension setup (such as a mountain bike) is being ridden on the road, the nominal value could be even larger (e.g., less than 3") such that the change in measurement (e.g., a 2" deep pothole) would not be larger than the nominal value.

When the sensor obtains a time-of-flight of x+n (where n is a value that is larger than the nominal value) it would mean that a depression (or hole) is detected. Moreover, the size of n would provide information about the depth of the depression, the size of the depression, the geometry (e.g., angle or grade) of the depression, etc.

In contrast, when the sensor obtains a time of flight of x-n, a bump (or rise) is detected. Here, the size of n would provide information about the height of the rise, the size of the rise, the geometry of the rise, etc.

In one embodiment, the n value is preset for the type of active suspension, the terrain type, the vehicle type, the ride type, or the like.

For example, in one embodiment, the time of flight sensor detects a depression in the terrain. The depression data generated by the time of flight sensor is provided to the damping suspension controller which will then compare the measurement data against the nominal value and generate a command to one or more of the active valves to change to the damping setting of one or more dampers when the nominal value is exceeded. For example, a compression damping setting would be softened, a rebound damping speed setting would be increased, etc.

In one embodiment, after detecting the depression, the time of flight sensor detects an upcoming rise in the terrain (e.g., the other side of the depression) and then makes a number of consistent measurements indicating a (relatively) smooth surface. In one embodiment, the rise in the terrain and the return to a constant distance measurement data generated by the time of flight sensor is provided to the damping suspension controller. When the damping suspension controller determines that the obstacle has been passed, in one embodiment, it will generate the command to the active valve to change to the damping setting of the one or more dampers back to the pre-obstacle compression and/or rebound settings. For example, the compression damping setting would be stiffened, the rebound speed setting would be decreased, etc.

One or more sensors may be attached to the swing arm 26 directly, to any link thereof, to an intermediate mounting member, to front fork 34, or to any other portion or portions of the bicycle 50 as may be useful. In one embodiment, one or more sensors could be fixed to an unsprung portion of the bicycle 50, such as for example the swing arm assembly 10. In one embodiment, one or more sensors are fixed to a sprung portion of the bicycle 50, such as the frame 24.

In general, one or more sensors may be integrated with the vehicle structure and data processing system as described in U.S. Pat. Nos. 6,863,291; 4,773,671; 4,984,819; 5,390,949, 5,105,918; 6,427,812; 6,244,398; 5,027,303 and 6,935,157; each of which is herein incorporated, in its entirety, by reference. Sensors and valve actuators (e.g. electric solenoid or linear motor type—note that a rotary motor may also be used with a rotary actuated valve) may be integrated herein utilizing principles outlined in SP-861-Vehicle Dynamics and Electronic Controlled Suspensions SAE Technical Paper Series no. 910661 by Shiozaki et. al. for the International Congress and Exposition, Detroit, Mich., Feb. 25-Mar. 1, 1991 which paper is incorporated herein, in its entirety, by reference. Further, sensors and valves, or principles, of patents and other documents incorporated herein by reference, may be integrated one or more embodiments hereof, individually or in combination, as disclosed herein.

In one embodiment, a mobile device 200 is coupled with handlebar assembly 36. In one embodiment, the mobile device 200 is the only sensor on the bicycle 50. In one embodiment, bicycle 50 sensors includes a mobile device 200 and one or more of sensors 5, 35, (sensors 40, 41 of FIG. 1B), etc. Although mobile device 200 is shown mounted to handlebar assembly 36, it should be appreciated that the mobile device 200 could be mounted in a different location on bicycle 50, carried in a rider's backpack, pocket, or the like, stored in another location on the bike (e.g., under the seat pouch, etc.), or the like, and still provide the sensor input information.

Figure 2:
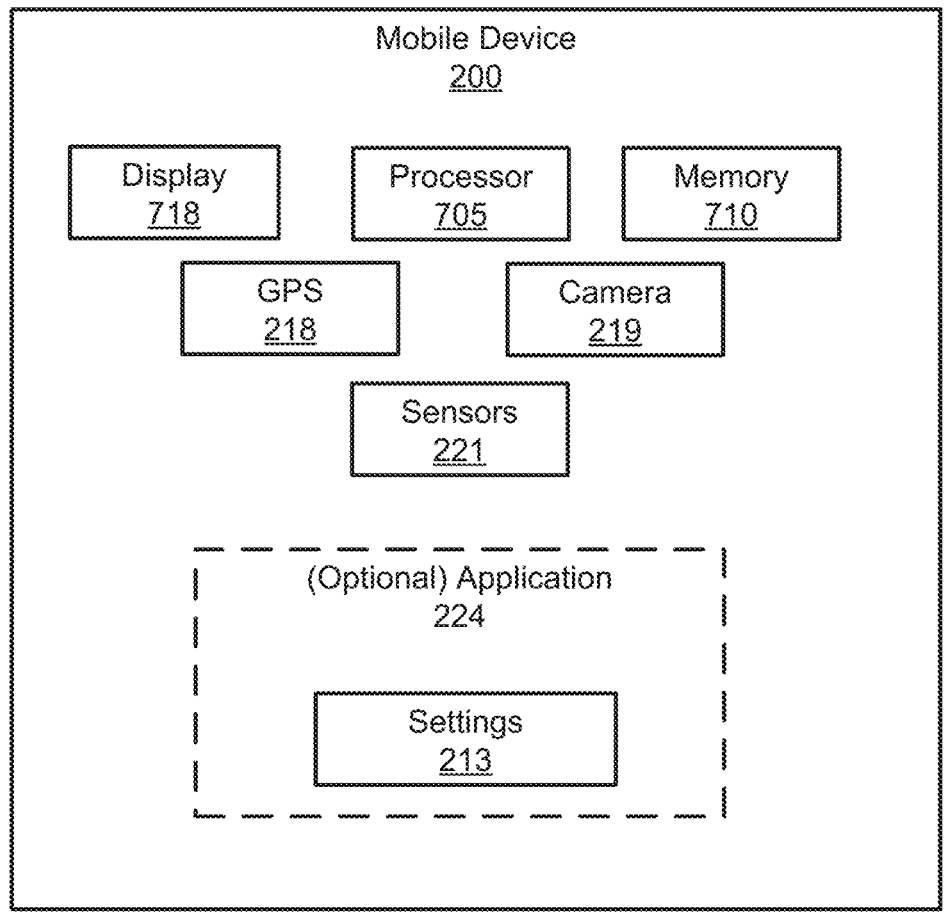
FIG. 2 is a block diagram of an exemplary number of components of a mobile device, in accordance with an embodiment.

Referring now to FIG. 2, a block diagram of a mobile device 200 is shown. Although a number of components are shown as part of mobile device 200, it should be appreciated that other, different, more, or fewer components may be found on mobile device 200.

In general, mobile device 200 is an example of a smart device. Mobile device 200 could be a mobile phone, a smart phone, a tablet, a smart watch, a piece of smart jewelry, smart glasses, or other user portable devices having wireless connectivity. In one embodiment, mobile device 200 is capable of broadcasting and receiving via at least one network, such as, but not limited to, VViFi, Cellular, Bluetooth, near field communication (NEC), and the like. In one embodiment, mobile device 200 includes a display 718, a processor 705, a memory 710, a GPS 218, a camera 219, and the like. In one embodiment, location information can be provided by GPS 218. In one embodiment, the location information could be determined (or enhanced) by the broadcast range of an identified beacon, a WiFi hotspot, overlapped area covered by a plurality of mobile telephone signal providers, or the like. In one embodiment, instead of using GPS information, the location of mobile device 200 may be determined within a given radius, such as the broadcast range of an identified beacon, a WiFi hotspot, overlapped area covered by a plurality of mobile telephone signal providers, or the like. In one embodiment, geofences are used to define a given area and an alert or other indication is made when the mobile device 200 enters into or departs from a geofence.

Mobile device 200 includes sensors 221 which can include one or more of audio, visual, motion, acceleration, altitude, GPS, and the like. In one embodiment, mobile device 200 includes an optional application 224 which operates thereon. In one embodiment, optional application 224 includes settings 213. Although settings 213 are shown as part of optional application 224, it should be appreciated that settings 213 could be located in a different application operating on mobile device 200, at a remote storage system separate from mobile device 200, or the like. Moreover, the mobile device 200 could include settings 213 that are web based and are not specifically associated with any application operating on mobile device 200. Thus, in one embodiment, there may be one, some or all of settings 213 without the optional application 224.

Connected Components

Referring again to FIGS. 1A and 1B, in one embodiment, one or a plurality of component(s) of the bicycle 50 are also connected component(s). Examples of the connected component(s) can include one or more of the forks, wheels, rear shocks, front shocks, handlebars, seat posts, pedals, cranks, and the like. In one embodiment, the connected component(s) will include connective features that allow them to communicate wired or wirelessly with controller 39, mobile device 200, one or more sensors, and/or any other connected component(s) within transmission range. In one embodiment, the sensors, smart devices, controllers, valves, and the like may be interconnected or connected by (one or a combination of) wire, or wirelessly via systems such as near field communication (NFC), WAN, LAN, Bluetooth, WiFi, ANT, GARMIN® low power usage protocol, or any suitable power or signal transmitting mechanism, making them connected components.

By using a connected component, data (including real-time data) can be collected from the connected component. Depending upon the connected component, data such as telemetry attributes to provide angle, orientation, velocity, acceleration, RPM, operating temperature, and the like, can be obtained. Moreover, general use data about the connected component can also be obtained.

For example, a connected fork would include a live valve that could be adjustable as discussed below in FIGS. 2A-2C, or could be a component that is stand alone and only provides settings, telemetry data including travel consumed, air pressure, rebound and damping speed, and adjustability feedback to the FCCP 800. An example of a connected fork is discussed in FIG. 1B (within the active valve system 75), or could be a component that is not part of an active valve system 75 and only provides settings, adjustability, and other telemetry data to the FCCP 800. An example of a connected rear shock would be active valve damper 38 that could be adjustable and within the active valve system 75), or could be a component that is not part of an active valve system 75 and only provides settings, adjustability, telemetry and other data to the FCCP 800.

An example of a connected component of type wheel would be a sensor that is attached to the wheel (or wheels) to provide telemetry such as RPM, tire pressure, tire temperature, or the like. For example, the connected component could be a smart valve stem, a MEMS device, or the like coupled with the rim of the wheel.

An example of a connected component of type handlebar would be a connected component that provides handlebar geometry information, handlebar dimensions, stress measurements, or the like. For example, the connected component could be a MEMS device coupled with the handlebar.

An example of a connected component of type seat post would be connected component that provides geometry information such as seat height, seat pitch, roll, yaw, seat forward or aft location, weight on the seat, or the like. For example, the connected component could be a MEMS device coupled with the seat post.

An example of a connected component of type pedal would be connected component that provides telemetry such as RPM's, push and pull pressure, left side versus right side performance data (e.g., a stronger force on the right pedal or left pedal, in the up or down direction), or the like. For example, the connected component could be a MEMS device or other sensor type coupled with the pedal(s).

An example of a connected component of type crank set would be connected component that provides telemetry such as RPM's, chain tension, chain temperature, internal crank temperature, bearing operation, or the like. For example, the connected component could be a MEMS device coupled with the crank set.

In one embodiment, a connected component on a second vehicle (or any number of linked vehicles) could be providing information to the first vehicle (e.g., mobile device 200, controller 39, or another connected component). For example, if two riders are riding two bikes within a transmission range, one or more components on the bicycles could be communicating wirelessly such that the information from the lead bike is also provided to the follow bicycle(s) (or automobiles, motorcycles, ATVs, snowmobiles, water vehicles, and the like). In so doing, the information from the lead vehicle can be used to provide the follow vehicle(s) with future-time information. That is, the front vehicle information is provided to the follow vehicle(s) a short time prior to the follow vehicle(s) reaching the location of the front vehicle and encountering what the front vehicle has already encountered.

Figure 3:
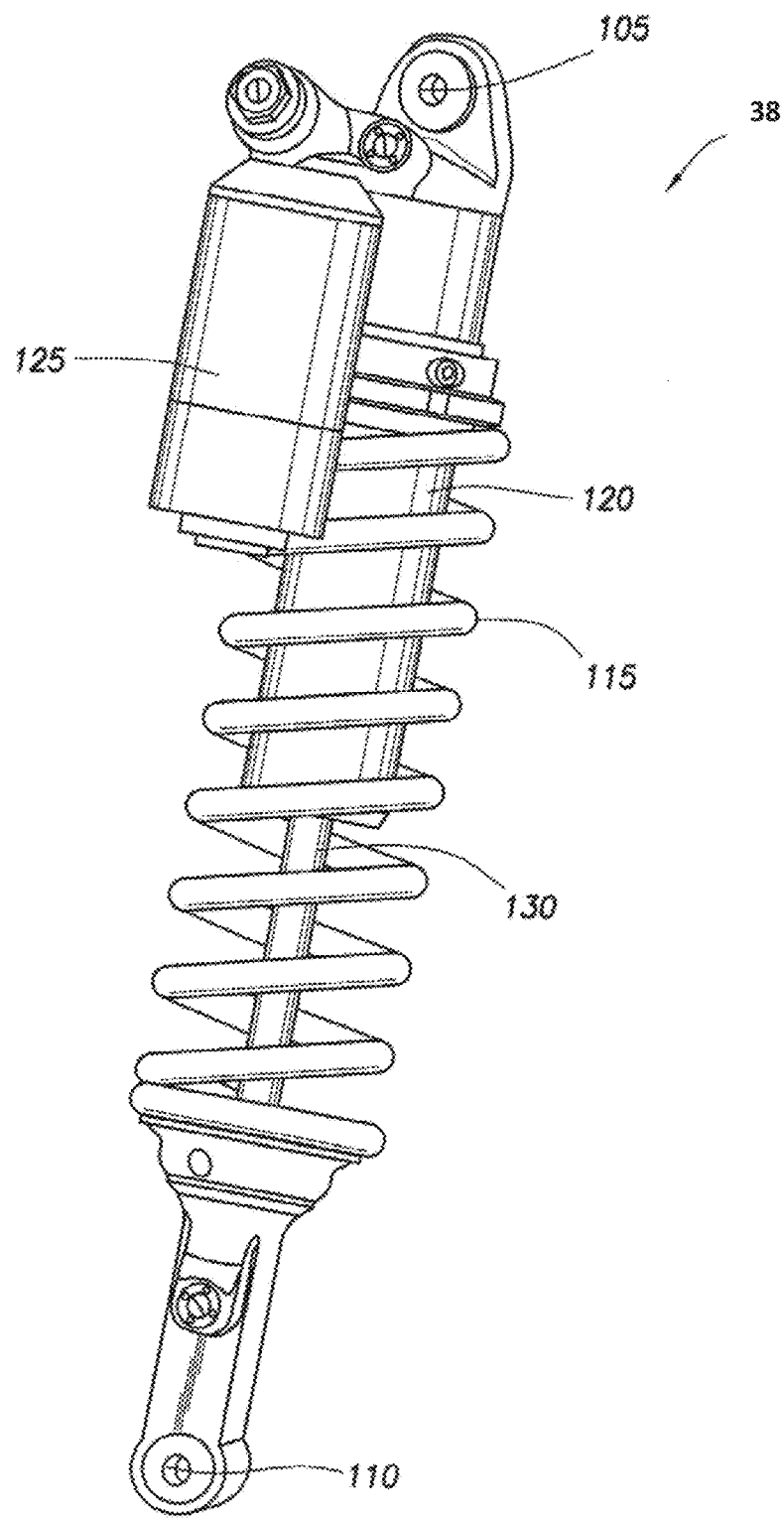
FIG. 3 is a perspective view of a damping assembly including a damper, external reservoir, and helical spring, in accordance with an embodiment.

FIG. 3 is a perspective view of an active valve damper 38. In one embodiment, active valve damper 38 includes eyelets 105 and 110, damper housing 120, helical spring 115, piston shaft 130, and piggyback (or external reservoir 125). In one embodiment, external reservoir 125 is described in U.S. Pat. No. 7,374,028 the content of which is entirely incorporated herein by reference.

In one embodiment, the damper housing 120 includes a piston and chamber and the external reservoir 125 includes a floating piston and pressurized gas to compensate for a reduction in volume in the main damper chamber of the damping assembly 38 as the piston shaft 130 moves into the damper body. Fluid communication between the main chamber of the damper and the external reservoir 125 may be via a flow channel including an adjustable needle valve. In its basic form, the damper works in conjunction with the helical spring and controls the speed of movement of the piston shaft by metering incompressible fluid from one side of the damper piston to the other, and additionally from the main chamber to the reservoir, during a compression stroke (and in reverse during the rebound or extension stroke).

Although a coil sprung damping assembly is shown in FIG. 3, this is provided as one embodiment and for purposes of clarity. In one embodiment, the active valve damper 38 could be a different type such as, but not limited to, an air sprung fluid damper assembly, a stand-alone fluid damper assembly, and the like.

Example Active Valve

Figure 4:
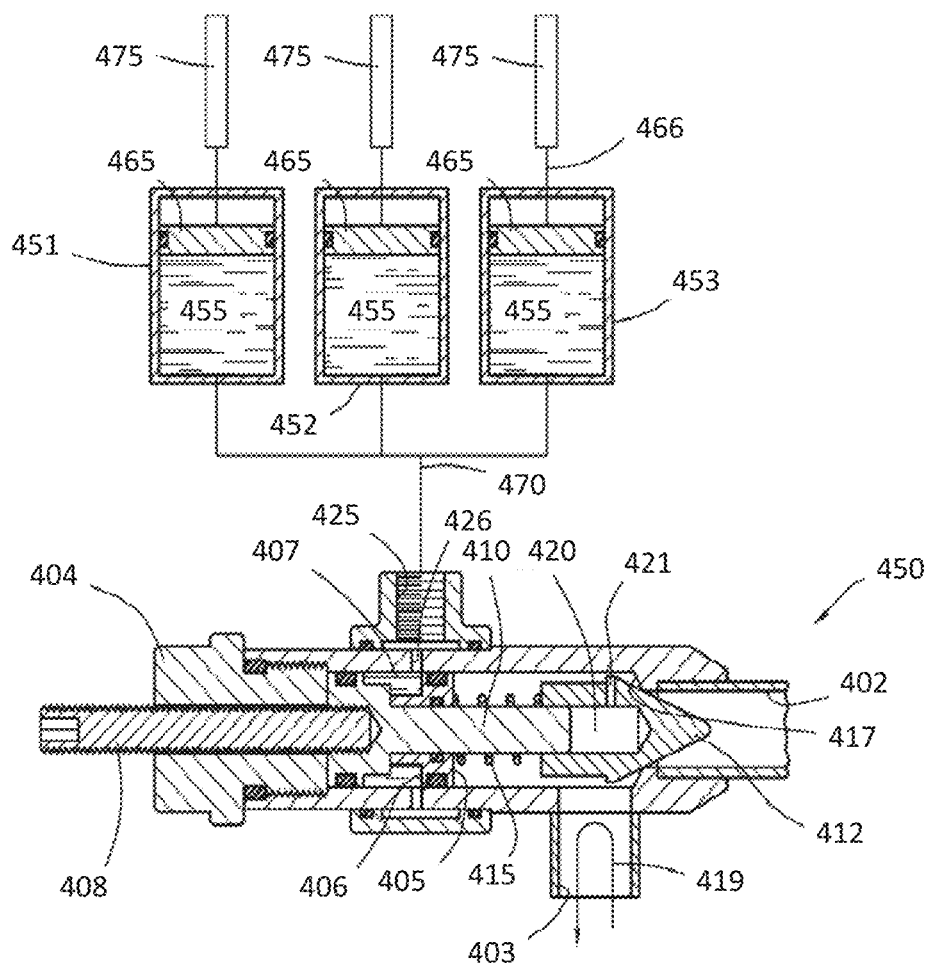
FIG. 4 is a schematic view of an active valve and a plurality of valve operating cylinders in selective communication with an annular piston surface of the active valve, in accordance with an embodiment.

Referring now to FIG. 4, a schematic view of an active valve 450 is shown in accordance with an embodiment. Although FIG. 4 shows the active valve 450 in a closed position (e.g. during a rebound stroke of the damper), the following discussion also includes the opening of active valve 450. Active valve 450 includes a valve body 404 housing a movable piston 405 which is sealed within the body. The piston 405 includes a sealed chamber 407 adjacent an annular piston surface 406 at a first end thereof. The chamber 407 and annular piston surface 406 are in fluid communication with a port 425 accessed via opening 426. Two additional fluid communication points are provided in the body including orifice 402 and orifice 403 for fluid passing through the active valve 450.

Extending from a first end of the piston 405 is a shaft 410 having a cone shaped member 412 (other shapes such as spherical or flat, with corresponding seats, will also work suitably well) disposed on an end thereof. The cone shaped member 412 is telescopically mounted relative to, and movable on, the shaft 410 and is biased toward an extended position due to a spring 415 coaxially mounted on the shaft 410 between the cone shaped member 412 and the piston 405. Due to the spring biasing, the cone shaped member 412 normally seats itself against a valve seat 417 formed in an interior of the valve body 404.

As shown, the cone shaped member 412 is seated against valve seat 417 due to the force of the spring 415 and absent an opposite force from fluid entering the active valve 450 along orifice 402. As cone shaped member 412 telescopes out, a gap 420 is formed between the end of the shaft 410 and an interior of cone shaped member 412. A vent 421 is provided to relieve any pressure formed in the gap. With a fluid path through the active valve 450 (from 403 to 402) closed, fluid communication is substantially shut off from the rebound side of the cylinder into the valve body (and hence to the compression side) and its "dead-end" path is shown by arrow 419.

In one embodiment, there is a manual pre-load adjustment on the spring 415 permitting a user to hand-load or un-load the spring using a threaded member 408 that transmits motion of the piston 405 towards and away from the conical member, thereby changing the compression on the spring 415.

Also shown in FIG. 4 is a plurality of valve operating cylinders 451, 452, 453. In one embodiment, the cylinders each include a predetermined volume of fluid 455 that is selectively movable in and out of each cylindrical body through the action of a separate corresponding piston 465 and rod 466 for each cylindrical body. A fluid path 470 runs between each cylinder and port 425 of the valve body where annular piston surface 406 is exposed to the fluid.

Because each cylinder has a specific volume of substantially incompressible fluid and because the volume of the sealed chamber 407 adjacent the annular piston surface 406 is known, the fluid contents of each cylinder can be used, individually, sequentially or simultaneously to move the piston a specific distance, thereby effecting the damping characteristics of the system in a relatively predetermined and precise way.

While the cylinders 451-453 can be operated in any fashion, in the embodiment shown each piston 465 and rod 466 is individually operated by a solenoid 475 and each solenoid, in turn, is operable from a remote location of the vehicle, like a cab of a motor vehicle or even the handlebar area of a motor or bicycle (not shown). Electrical power to the solenoids 475 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bottom out valve there is no issue involved in stepping from hydraulic system pressure to desired suspension bottom out operating pressure.

In one embodiment, e.g., when active valve 450 is in the damping-open position, fluid flow through orifice 402 provides adequate force on the cone shaped member 412 to urge it backwards, at least partially loading the spring 415 and creating a fluid flow path from the orifice 402 into and through orifice 403.

The characteristics of the spring 415 are typically chosen to permit active valve 450 to open at a predetermined pressure, with a predetermined amount of control pressure applied to port 425. For a given spring 415, higher control pressure at port 425 will result in higher pressure required to open the active valve 450 and correspondingly higher damping resistance in orifice 402. In one embodiment, the control pressure at port 425 is raised high enough to effectively "lock" the active valve closed resulting in a substantially rigid compression damper (particularly true when a solid damping piston is also used).

In one embodiment, the valve is open in both directions when the cone shaped member 412 is "topped out" against valve body 404. In another embodiment however, when the piston 405 is abutted or "topped out" against valve body 404 the spring 415 and relative dimensions of the active valve 450 still allow for the cone shaped member 412 to engage the valve seat 417 thereby closing the valve. In such embodiment backflow from the rebound side to the compression side is always substantially closed and cracking pressure from flow along orifice 402 is determined by the pre-compression in the spring 415. In such embodiment, additional fluid pressure may be added to the inlet through port 425 to increase the cracking pressure for flow along orifice 402 and thereby increase compression damping. It is generally noteworthy that while the descriptions herein often relate to compression damping and rebound shut off, some or all of the channels (or channel) on a given suspension unit may be configured to allow rebound damping and shut off or impede compression damping.

While the examples illustrated relate to manual operation and automated operation based upon specific parameters, in various embodiments, active valve 450 can be remotely-operated and can be used in a variety of ways with many different driving and road variables and/or utilized at any point during use of a vehicle. In one example, active valve 450 is controlled based upon vehicle speed in conjunction with the angular location of the vehicle's steering wheel. In this manner, by sensing the steering wheel turn severity (angle of rotation and rotational velocity), additional damping (by adjusting the corresponding size of the opening of orifice 402 by causing cone shaped member 412 to open, close, or partially close orifice 402) can be applied to one shock absorber or one set of vehicle shock absorbers on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of active valve 450 (and corresponding change to the working size of the opening of orifice 402 by causing cone shaped member 412 to open, close, or partially close orifice 402) in response thereto. In another example, active valve 450 is controlled at least in part by a pressure transducer measuring pressure in a vehicle tire and adding damping characteristics to some or all of the wheels (by adjusting the working size of the opening of orifice 402 by causing cone shaped member 412 to open, close, or partially close orifice 402) in the event of, for example, an increased or decreased pressure reading.

In one embodiment, active valve 450 is controlled in response to vehicle changes in motion (e.g., acceleration, deceleration, etc.). In still another example, a parameter might include a gyroscopic mechanism that monitors vehicle trajectory and identifies a "spin-out" or other loss of control condition and adds and/or reduces damping to some or all of the vehicle's dampers (by adjusting the working size of the opening of orifice 402 by causing cone shaped member 412 to open, close, or partially close orifice 402 chambers) in the event of a loss of control to help the operator of the vehicle to regain control.

For example, active valve 450, when open, permits a first flow rate of the working fluid through orifice 402. In contrast, when active valve 450 is partially closed, a second flow rate of the working fluid though orifice 402 occurs. The second flow rate is less than the first flow rate but greater than no flow rate. When active valve 450 is completely closed, the flow rate of the working fluid though orifice 402 is statistically zero.

In one embodiment, instead of (or in addition to) restricting the flow through orifice 402, active valve 450 can vary a flow rate through an inlet or outlet passage within the active valve 450, itself. See, as an example, the electronic valve of FIGS. 2-4 of U.S. Pat. No. 9,353,818 which is incorporated by reference herein, in its entirety, as further example of different types of "electronic" or "active" valves). Thus, the active valve 450, can be used to meter the working fluid flow (e.g., control the rate of working fluid flow) with/or without adjusting the flow rate through orifice 402.

Due to the active valve 450 arrangement, a relatively small solenoid (using relatively low amounts of power) can generate relatively large damping forces. Furthermore, due to incompressible fluid inside the active valve damper 38, damping occurs as the distance between cone shaped member 412 and orifice 402 is reduced. The result is a controllable damping rate. Certain active valve features are described and shown in U.S. Pat. Nos. 9,120,362; 8,627,932; 8,857,580; 9,033,122; and 9,239,090 which are incorporated herein, in their entirety, by reference.

It should be appreciated that when the valve body 404 rotates in a reverse direction than that described above and herein, the cone shaped member 412 moves away from orifice 402 providing at least a partially opened fluid path.

Figure 5:
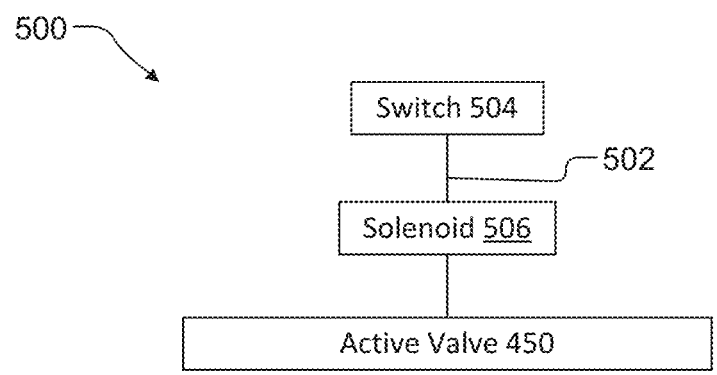
FIG. 5 is a flow diagram showing a control arrangement for an active valve, in accordance with an embodiment.

FIG. 5 is a flow diagram of a control arrangement 500 for a remotely-operated active valve 450. As illustrated, a signal line 502 runs from a switch 504 to a solenoid 506. Thereafter, the solenoid 506 converts electrical energy into mechanical movement and rotates valve body 404 within active valve 450, In one embodiment, the rotation of valve body 404 causes an indexing ring consisting of two opposing, outwardly spring-biased balls to rotate among indentions formed on an inside diameter of a lock ring.

As the valve body 404 rotates, cone shaped member 412 at an opposite end of the valve is advanced or withdrawn from an opening in orifice 402. For example, the valve body 404 is rotationally engaged with the cone shaped member 412. A male hex member extends from an end of the valve body 404 into a female hex profile bore formed in the cone shaped member 412. Such engagement transmits rotation from the valve body 404 to the cone shaped member 412 while allowing axial displacement of the cone shaped member 412 relative to the valve body 404. Therefore, while the body does not axially move upon rotation, the threaded cone shaped member 412 interacts with mating threads formed on an inside diameter of the bore to transmit axial motion, resulting from rotation and based on the pitch of the threads, of the cone shaped member 412 towards or away from an orifice 402, between a closed position, a partially open position, and a fully or completely open position.

Adjusting the opening of orifice 402 modifies the flowrate of the fluid through active valve 450 thereby varying the stiffness of a corresponding active valve damper 38. While FIG. 5 is simplified and involves control of a single active valve 450, it will be understood that any number of active valves corresponding to any number of fluid channels (e.g., bypass channels, external reservoir channels, bottom out channels, etc.) for a corresponding number of vehicle suspension dampers could be used alone or in combination. That is, one or more active valves could be operated simultaneously or separately depending upon needs in a vehicular suspension system.

For example, a suspension damper could have one, a combination of, or each of an active valve(s). The active valve(s) could be used for fluid flow path control, for bottom out control, for an internal bypass, for an external bypass, for a fluid conduit to the external reservoir 125, etc. In other words, anywhere there is a fluid flow path within active valve damper 38, an active valve could be used. Moreover, the active valve could be alone or used in combination with other active (semi-active, or passive) valves at other fluid flow paths to automate one or more of the damping performance characteristics of the damping assembly. Moreover, additional switches could permit individual operation of separate active bottom out valves.

In addition to, or in lieu of, the simple, switch-operated remote arrangement of FIG. 5, the remotely-operable active valve 450 can be operated automatically based upon one or more driving conditions, and/or automatically or manually utilized at any point during use of a vehicle.

Figure 6:
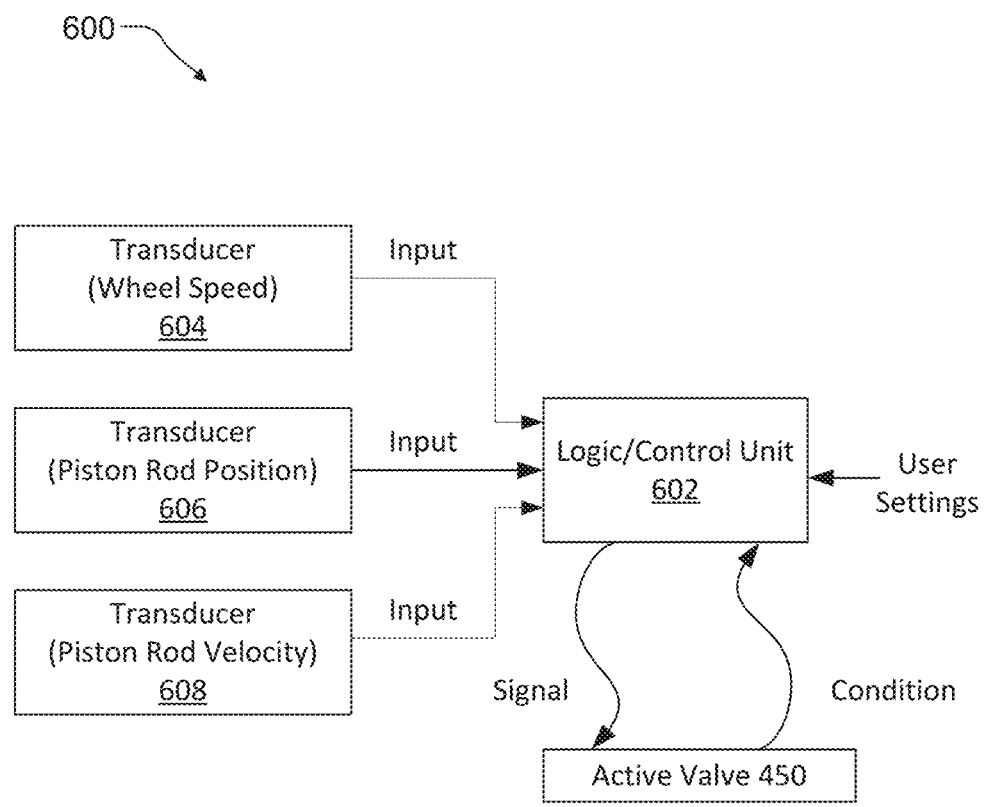
FIG. 6 is a flow diagram of a control system based upon any or all of vehicle speed, damper rod speed, and damper rod position, in accordance with an embodiment.

FIG. 6 is a flow diagram of a control system 600 based upon any or all of vehicle speed, damper rod speed, and damper rod position. One embodiment of the arrangement of control system 600 is designed to automatically increase damping in a shock absorber in the event a damper rod reaches a certain velocity in its travel towards the bottom end of a damper at a predetermined speed of the vehicle.

In one embodiment, the control system 600 adds damping (and control) in the event of rapid operation (e.g. high rod velocity) of the active valve damper 38 to avoid a bottoming out of the damper rod as well as a loss of control that can accompany rapid compression of a shock absorber with a relative long amount of travel. In one embodiment, the control system 600 adds damping (e.g., adjusts the size of the opening of orifice 402 by causing cone shaped member 412 to open, close, or partially close orifice 402) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

FIG. 6 illustrates, for example, a control system 600 including three variables: wheel speed, corresponding to the speed of a vehicle component (measured by wheel speed transducer 604), piston rod position (measured by piston rod position transducer 606), and piston rod velocity (measured by piston rod velocity transducer 608). Any or all of the variables shown may be considered by logic unit 602 in controlling the solenoids or other motive sources coupled to active valve 450 for changing the working size of the opening of orifice 402 by causing cone shaped member 412 to open, close, or partially close orifice 402. Any other suitable vehicle operation variable may be used in addition to or in lieu of the variables discussed herein, such as, for example, piston rod compression strain, eyelet strain, vehicle mounted accelerometer (or tilt/inclinometer) data or any other suitable vehicle or component performance data.

In one embodiment, the piston's position within the damping chamber is determined using an accelerometer to sense modal resonance of the suspension damper or other connected suspension element such as the tire, wheel, or axle assembly. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension damper.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension damper measure piston rod velocity (piston rod velocity transducer 608), and piston rod position (piston rod position transducer 606), a separate wheel speed transducer 604 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 6, the logic unit 602 with user-definable settings receives inputs from piston rod position transducer 606, piston rod velocity transducer 608, as well as wheel speed transducer 604. Logic unit 602 is user-programmable and, depending on the needs of the operator, logic unit 602 records the variables and, then, if certain criteria are met, logic unit 602 sends its own signal to active valve 450 (e.g., the logic unit 602 is an activation signal provider) to cause active valve 450 to move into the desired state (e.g., adjust the flow rate by adjusting the distance between cone shaped member 412 and orifice 402). Thereafter, the condition, state, or position of active valve 450 is relayed back to logic unit 602 via an active valve monitor or the like.

In one embodiment, logic unit 602 shown in FIG. 6 assumes a single active valve 450 corresponding to orifice 402 of active valve damper 38, but logic unit 602 is usable with any number of active valves or groups of active valves corresponding to any number of orifices, or groups of orifices. For instance, the suspension dampers on one side of the vehicle can be acted upon while the vehicles other suspension dampers remain unaffected.

Figure 7:
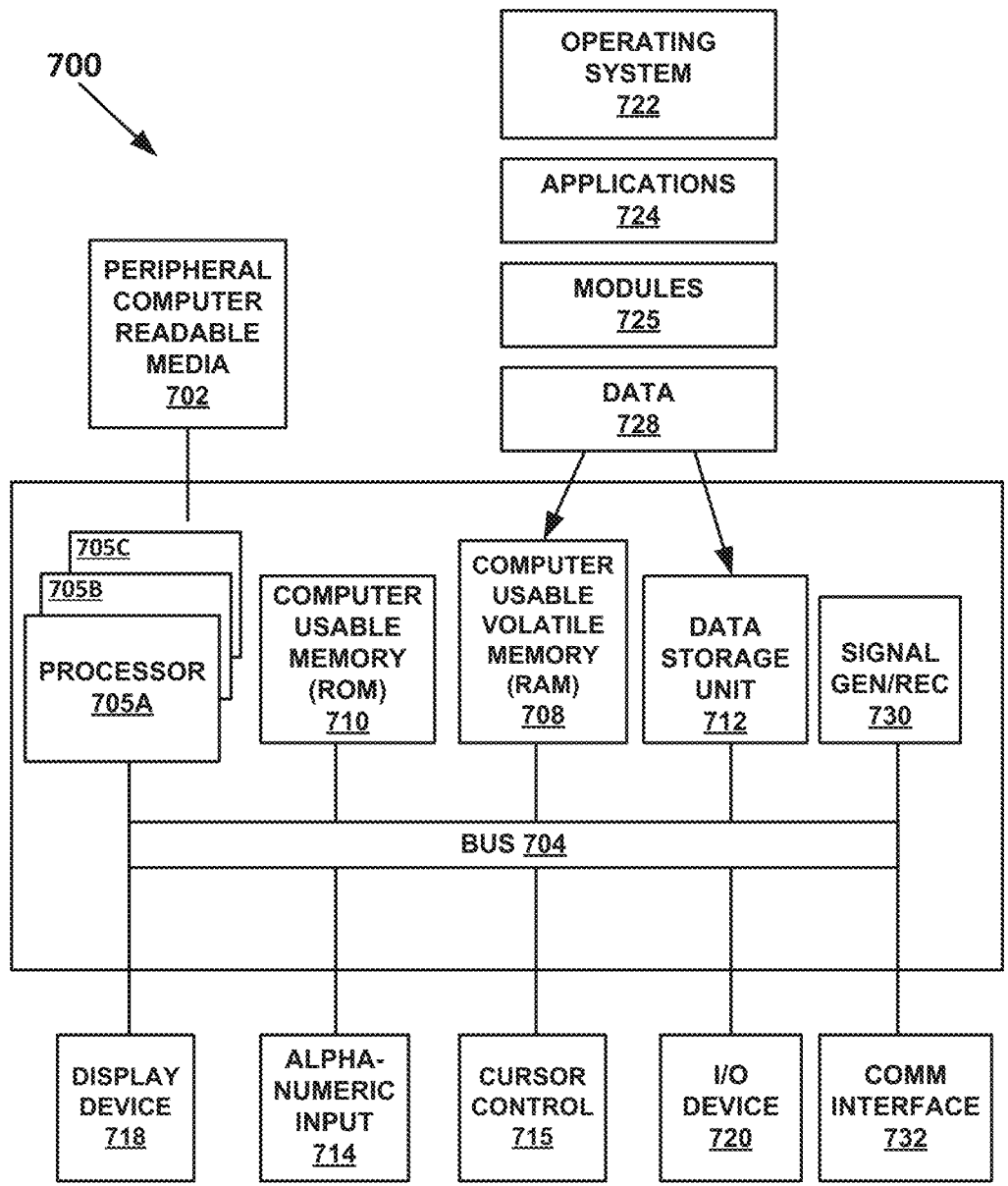
FIG. 7 is block diagram of an example computer system with which or upon which various embodiments of the present invention may be implemented.

With reference now to FIG. 7, an example computer system 700 is shown. In the following discussion, computer system 700 is representative of a system or components that may be used with aspects of the present technology. In one embodiment, different computing environments will only use some of the components shown in computer system 700.

In general, suspension controller 39 can include some or all of the components of computer system 700. In different embodiments, suspension controller 39 can include communication capabilities (e.g., wired such as ports or the like, and/or wirelessly such as near field communication, Bluetooth, WiFi, or the like) such that some of the components of computer system 700 are found on suspension controller 39 while other components could be ancillary but communicatively coupled thereto (such as a mobile device, tablet, computer system or the like). For example, in one embodiment, suspension controller 39 can be communicatively coupled to one or more different computing systems to allow a user (or manufacturer, tuner, technician, etc.) to adjust or modify any or all of the programming stored in suspension controller 39. In one embodiment, the programming includes computer-readable and computer-executable instructions that reside, for example, in non-transitory computer-readable medium (or storage media, etc.) of suspension controller 39 and/or computer system 700.

In one embodiment, computer system 700 includes an address/data/service bus 704 for communicating information, and a processor 705A coupled to bus 704 for processing information and instructions. As depicted in FIG. 7, computer system 700 is also well suited to a multi-processor environment in which a plurality of processors 705A, 705B, and 705C are present. Conversely, computer system 700 is also well suited to having a single processor such as, for example, processor 705A. Processors 705A, 705B, and 705C may be any of various types of microprocessors. Computer system 700 also includes data storage features such as a computer usable volatile memory 708, e.g., random access memory (RAM), coupled to bus 704 for storing information and instructions for processors 705A, 705B, and 705C.

Computer system 700 also includes computer usable non-volatile memory 710, e.g., read only memory (ROM), coupled to bus 704 for storing static information and instructions for processors 705A, 705B, and 705C. Also present in computer system 700 is a data storage unit 712 (e.g., a magnetic disk drive, optical disk drive, solid state drive (SSD), and the like) coupled to bus 704 for storing information and instructions. Computer system 700 also can optionally include an alpha-numeric input device 714 including alphanumeric and function keys coupled to bus 704 for communicating information and command selections to processor 705A or processors 705A, 705B, and 705C. Computer system 700 also can optionally include a cursor control device 715 coupled to bus 704 for communicating user input information and command selections to processor 705A or processors 705A, 705B, and 705C. Cursor control device may be a touch sensor, gesture recognition device, and the like. Computer system 700 of the present embodiment can optionally include a display device 718 coupled to bus 704 for displaying information.

Referring still to FIG. 7, display device 718 can be a liquid crystal device, cathode ray tube, OLED, plasma display device or other display device suitable for creating graphic images and alpha-numeric characters recognizable to a user. Cursor control device 715 allows the computer user to dynamically signal the movement of a visible symbol (cursor) on a display screen of display device 718. Many implementations of cursor control device 715 are known in the art including a trackball, mouse, touch pad, joystick, non-contact input, gesture recognition, voice commands, bio recognition, and the like. In addition, special keys on alpha-numeric input device 714 capable of signaling movement of a given direction or manner of displacement. Alternatively, it will be appreciated that a cursor can be directed and/or activated via input from alpha-numeric input device 714 using special keys and key sequence commands.

Computer system 700 is also well suited to having a cursor directed by other means such as, for example, voice commands. Computer system 700 also includes an I/O device 720 for coupling computer system 700 with external entities. For example, in one embodiment, I/O device 720 is a modem for enabling wired or wireless communications between computer system 700 and an external network such as, but not limited to, the Internet or intranet. A more detailed discussion of the present technology is found below.

Referring still to FIG. 7, various other components are depicted for computer system 700. Specifically, when present, an operating system 722, applications 724, modules 725, and data 728 are shown as typically residing in one or some combination of computer usable volatile memory 708, e.g. random-access memory (RAM), and data storage unit 712. However, it is appreciated that in some embodiments, operating system 722 may be stored in other locations such as on a network or on a flash drive; and that further, operating system 722 may be accessed from a remote location via, for example, a coupling to the Internet. The present technology may be applied to one or more elements of described computer system 700.

Computer system 700 also includes one or more signal generating and receiving device(s) 730 coupled with bus 704 for enabling computer system 700 to interface with other electronic devices and computer systems. Signal generating and receiving device(s) 730 of the present embodiment may include wired serial adaptors, modems, and network adaptors, wireless modems, and wireless network adaptors, and other such communication technology. The signal generating and receiving device(s) 730 may work in conjunction with one (or more) communication interface 732 for coupling information to and/or from computer system 700. Communication interface 732 may include a serial port, parallel port, Universal Serial Bus (USB), Ethernet port, Bluetooth, thunderbolt, near field communications port, VViFi, Cellular modem, or other input/output interface. Communication interface 732 may physically, electrically, optically, or wirelessly (e.g., via radio frequency) couple computer system 700 with another device, such as a mobile phone, radio, or computer system.

Connected Component Platform

Figure 8:
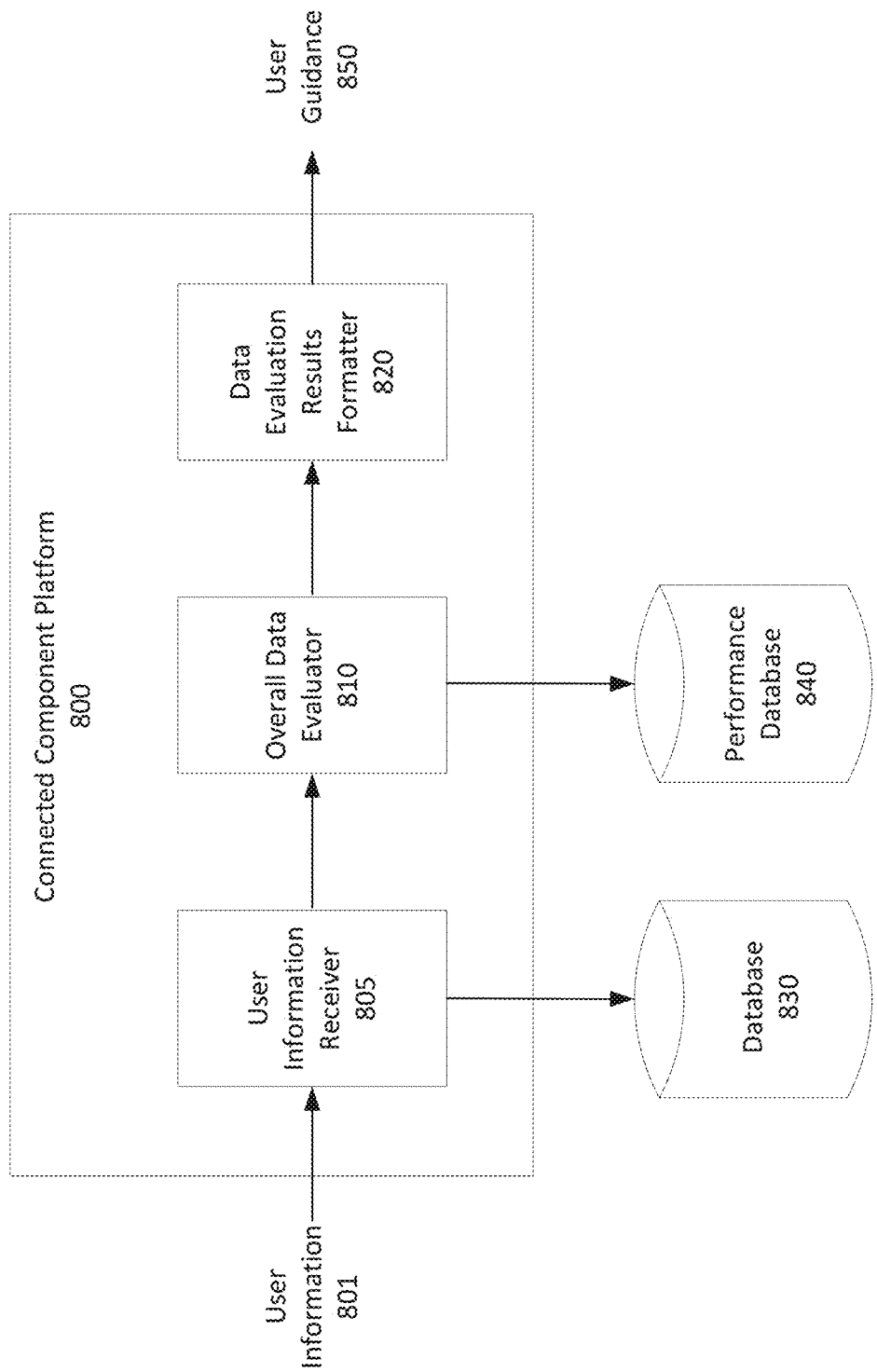
FIG. 8 is a block diagram of a connected component platform, in accordance with an embodiment.

FIG. 8 is a block diagram of a FCCP 800, in accordance with an embodiment. In one embodiment, FCCP 800 provides for the collection of present data, static data, and real-time data from various sources. The FCCP 800 further evaluates the data in view of user specific, vehicle specific, and/or component specific features and characteristics and generates user evaluation data. The FCCP 800 then presents the user evaluation data in a novel way to a user's computer system, mobile device, web service, Internet accessible page, via an application, or the like. The user evaluation data facilitating the optimal use of the equipment, ultimately resulting in a more enjoyable riding or driving experience.

In addition, the FCCP 800 provides a novel approach for incorporating actual rider characteristics and bike specifications/features, with location information, manufacturer suggested operation envelops, other rider's settings, and actual performance evaluations to provide a rider with a setup that would previously only have been available to a professional rider, team rider, etc.

In other words, as described herein, by using the FCCP 800, any rider will be able to obtain a professional, personally customized set-up and settings configuration information that is based on the actual rider, the actual vehicle being used, the actual components on the vehicle, and the use of specific adjustment inputs based on an actual riding location and the actual real-time (or near real-time) environmental conditions. Further, in one embodiment, the settings and performance settings, suggestions, and feedback are consistently updated.

In one embodiment, the connected component connectivity allows the connected component(s) to provide the obtained data to FCCP 800. In one embodiment, the connected component(s) provide the data to a wireless transmitter such as mobile device 200 which can provide the information to the FCCP 800. In another embodiment, the connected component(s) can provide the data to a data store on the vehicle such as a storage in controller 39. The information can then be accessed when the user couple's controller 39 with a computer system and uploads the connected component(s) data to FCCP 800.

In one embodiment, FCCP 800 receives user information 801 and provides user guidance 850. In one embodiment, FCCP 800 includes a user information receiver 805, an overall data evaluator 810, and a data evaluation results formator 820. In one embodiment, FCCP 800 utilizes the Internet (or the like) to access a database 830 and a performance database 840.

User information 801 will include data from the connected components (e.g., the bicycle) and the user.

Figure 9:
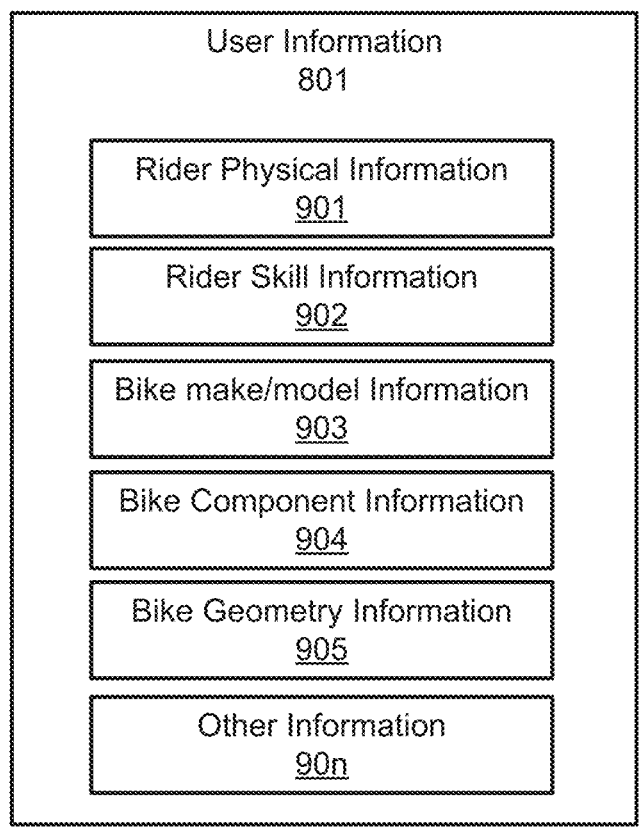
FIG. 9 is a block diagram of a display having a number of user inputs shown for the connected component platform, in accordance with an embodiment.

For example, referring now to FIG. 9, a block diagram of a display having a number of user information 801 inputs is shown in accordance with an embodiment. In general, the user information 801 is provided through a computing device such as a mobile device 200, a computing device, or the like. In one embodiment, the user information uses the communication capabilities of mobile device 200 (or another computing device such as a home computer) to communicate with FCCP 800. The communication could be Bluetooth, near field communication (NFC), WiFi, cellular, or any other available wireless communication.

In one embodiment, user information 801 provides a number of inputs to help establish the vehicle type, components, settings, and characteristics for the user's specific vehicle. In one embodiment, the inputs also include rider information. For example, user information 801 could include a category for rider physical information 901 which could include one or a combination of features such as rider height, weight, gender, age, body mass, body type, fitness level, heart rate, and the like. Rider skill information 902, e.g., beginner, intermediate, advanced, professional, etc., or rider motivation (e.g., fun ride, race, workout, etc.), and the like.

The user information 801 for vehicle information could include aspects such as, but not limited to, bike make model information 903, such as, bike manufacturer, bike model, bike use, e.g., road, gravel, mountain, BMX, etc.

Bike component information 904 would include information about one or more components on the bike. The information could include full suspension, half suspension, gearing, weight, tires, wheels, cranks, pedals, seat, manufacturer of components, the number of connected components, modifications to vehicle or components (e.g., additions, deletions, changes, etc.) and the like.

User information 801 could also include bike geometry information 905 such as: sizing and geometry. For example, sizing information includes aspects such as, but not limited to, frame size, wheel size, tire size, crank arm length, handlebar width, component settings, and the like. Geometry information would include features such as, seat height, seat pitch, seat offset, handlebar offset (fore or aft), location of components on handlebar (e.g., brake lever, gear shift, dropper lever, various inputs, etc.), handlebar-to-seat distance, seat-to-pedal distance, seat-to-ground distance, front-to-rear wheel distance, front fork angle, center of gravity (CG), and the like. Further, there could be one or more other information $90n$ categories that could be added to the inputs. In one embodiment, the user information 801 could be more or fewer of the above categories, could be different categories, could be user selectable, FCCP 800 driven, and the like. The use of the described categories herein is provided as one embodiment.

In one embodiment, some or all of the above information could be obtained by user input, by data communicated from the connected component(s) such as one or more sensors on the vehicle, one or more connected components on the vehicle, the user's mobile device 200, by data communicated from other networked devices such as a smart scale, smart watch or other smart jewelry that monitors one or more user's biometrics (e.g., heart rate, body mass, temperature, etc.), environmental metrics, or the like.

Referring again to FIG. 8, in one embodiment, the user information 801 could be received at FCCP 800 from a number of different sources. In one embodiment, the data from any connected components, user provided input, and the Ike could be provided to a single source (such as a user's mobile device 200 having the FCCP 800 operating thereon). In another embodiment, the user's mobile device 200 (or another single source) would then provide the user information 801 to another portion of FCCP 800 operating on a different computing device (e.g., a notebook, laptop, tablet, desktop, etc.).

In one embodiment, some or all of the information could be obtained once, or obtained repeatedly. For example, aspects like rider height, and bike model would be collected and reviewed much less often as they are not prone to change. In contrast, other data such as component information, geometry, biometrics, and the like could be collected weekly, daily, hourly, in real-time when the vehicle is in use, or the like. Thus, the frequency of data collection could be a standard, could be different based on the category, could be different based on the likelihood of changes occurring, could be established by FCCP 800, could be established by a user selected interval, or the like.

Thus, the user information 801 can be captured by one connected component, a few connected components, many connected components, or the like. Moreover, the number of connected components is expandable. For example, the FCCP 800 could initially receive data from a single connected component. Then, as connected components are added and become connected components, or as new components are coupled with a connected component, the additional information from the connected component will be added to the user information 801 provided to the FCCP 800.

For example, in one embodiment, the number of connected components on the vehicle is one and it is the user's mobile device 200. As such, some of user information 801 would be obtained by an image capture device (such as camera 219) that obtains an image of the bike, a bike component, a 1D or 2D code on the bike or bike component, and the like. In one embodiment, the captured image(s) are then evaluated by the FCCP 800 (or other recognition capability) to make one or more bike specific measurement determinations therefrom, make one or more bike part specific component brand/model/year determination(s), make one or more bike brand/model/year determination(s), make one or more bike geometric determination(s) (e.g., seat height-from ground, seat height-from cranks, etc.; wheel diameter, type/brand/wear of tires, and the like). Then, as different connected components are added to the vehicle, they will be connected and then will be able to provide additional user information 801. For example, a connected crank would be able to provide RPM information, stress measurements, chain temperature measurements, chain skip occurrences, environmental data (e.g., water, sand, dust, temperature, etc.) and the like. Thus, each addition of a connected component would provide further detail to the user information 801 being provided to FCCP 800.

In one embodiment, FCCP 800 receives the user information 801 using user information receiver 805. User information receiver 805 will then access a database 830 and use the user information 801 to find information about the vehicle, the reported components, and the like. In one embodiment, database 830 could be a proprietary database, or it could be a database that includes Internet (or other network type) access such that user information receiver 805 can search and find vehicle and component information.

In one embodiment, once the user information receiver 805 finds the underlying information about the vehicle (e.g., measurements, weights, and specifications), user information receiver will provide the user information 801 and the found underlying information to overall data evaluator 810.

For example, the data obtained by user information receiver could include information such as: the user is a novice that is 6' tall, weighs 150 lbs. and is in good physical condition with a resting heart rate of 75. The bike is a name brand mountain bike model x3, weighing 58 lbs., with full suspension and a FOX live valve at setting 2. The bike geometry is x, the seat is 4 feet off of the ground and 3.5 feet above the lowest pedal position. The tires are Michelin model XGV, size 75-R, 14; etc.

In one embodiment, overall data evaluator 810 will use the data received from user information receiver 805 to automatically evaluate the present settings and components of the bike. In one embodiment, overall data evaluator 810 will also use a reference database such as performance database 840 to obtain bike specific, user specific settings, component specific setting, collected telemetry data, and configuration information. In one embodiment, performance database 840 is a proprietary database that is updated with knowledge from previous rides, component evaluations, and the like.

Overall data evaluator 810 will compare the present vehicle settings, components, configurations, geometries, and the like, with the settings that would be better suited for a novice 6' tall rider weighing 150 lbs. and is in good physical condition with a resting heart rate of 75 as applied to a name brand mountain bike model x3, weighing 58 lbs., with full suspension and a FOX live valve setting 2. The bike geometry is x, the seat is 4 feet off of the ground and 3.5 feet above the lowest pedal position. The tires are Michelin model XGV, size 75R14; The ride is on a fire road in Oregon, etc.

For example, the overall data evaluator 810 could determine that the rider as described would be better suited to a FOX live valve setting 1, rebound setting of 3, and damping setting of 4. The bike geometry adjusted to x-y, the seat raised to 3.5 feet off of the ground and 3 feet above the lowest pedal position, etc. Although a number of values are disclosed the example is merely one of a number of possible evaluations. The user information receiver 805 could obtain more or less data, the overall data evaluator 810 could make more or fewer suggestions, etc. Moreover, if the bike were initially in need of a number of changes, the overall data evaluator 810 may initially provide one or a few significant changes and then wait until the bike is used after the significant change(s) is made and then reevaluate the data based on the new information.

Figure 10A:
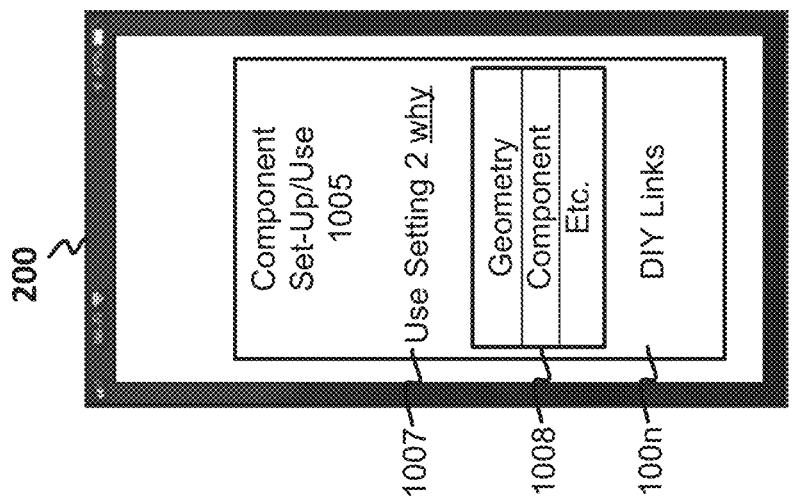
FIG. 10A is a mockup of an exemplary presentation of a component set-up and use configuration for the user and shown on a display of a computing device, in accordance with an embodiment.

Data evaluation results formator 820 will receive the determinations made by overall data evaluator 810 and format them into a user accessible format. For example, as shown in FIG. 10A, component set-up and use 1005 is an embodiment of user guidance 850 displayed on a computer screen, a mobile device screen, a web page, or the like. Further, the data evaluation results formator 820 could provide the user guidance 850 in a number of different methods. The user guidance 850 could be presented such that the initial changes are provided and then the user could dig down to find out the reasoning for the changes 1007; the user guidance 850 could be presented in categories 1008, e.g., bike geometry, component adjustment, etc. In one embodiment, the user guidance 850 could include links 100$n$ to videos or other DIY information.

Figure 10B:
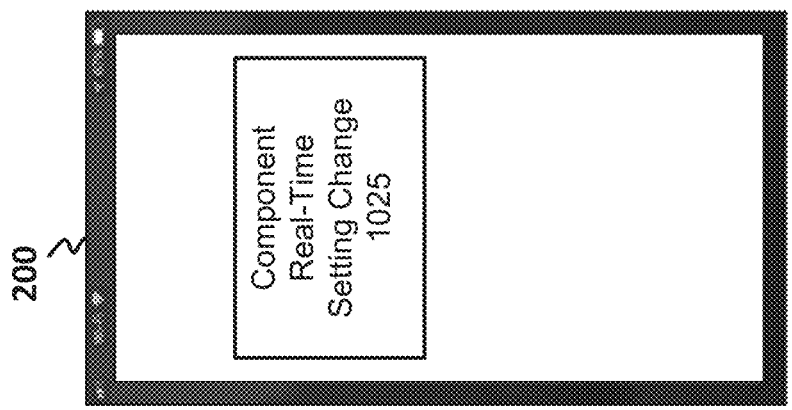
FIG. 10B is a mockup of an exemplary presentation of a real-time component setting change recommendation for the user and shown on a display of a computing device, in accordance with an embodiment.

In one embodiment, the user's mobile device 200 (or one or more connected components in communication with the user's mobile device) would obtain real-time performance data such as speed, pitch, roll, yaw, altitude, component performance characteristics, and the like. As shown in FIG. 10B, the real-time performance data would be part of the user information 801 provided to FCCP 800 to allow the FCCP 800 to provide user guidance 850 that was displayed to the rider on mobile device 200 to manually change one or more settings in real-time 1025.

Thus, FCCP 800 will present the user guidance 850 such that the rider is informed of his/her performance and the performance of one or more components on the vehicle. Moreover, based on the collected data, FCCP 800 will provide riding, tuning and/or component upgrade suggestions to aid in the rider's future experiences/rides.

In one embodiment, FCCP 800 could be part of an app on mobile device 200 that could then communicate directly with the connected components and provide the user guidance 850 information to the rider via the mobile device display. In one embodiment, FCCP 800 could communicate with another device that provides the power to the connected components (e.g., a Bosch Kiox HMI, or the like). In one embodiment, the rider can make setting and configuration changes (while stopped, on-the-fly, or the like) via the FCCP 800 or the FCCP application.

Location Specific Real-Time Guidance

In one embodiment, user information 801 could also include location information. The location information could be GPS location, WiFi location information, Cellular network location information, or any information that could be used by the mobile device 200 (or any other connected component) to obtain location information.

In one embodiment, performance database 840 could include location information that would define an area (such as a geofence, elevation level, terrain type, or the like). When the mobile device 200 enters into the area overall data evaluator 810 would update one or more of the evaluation results to match the user's component settings with previously established settings for the given area. The update to the user's component settings could be provided as user guidance 850 to the rider to modify the user's present component settings.

In one embodiment, performance database 840 could include information provided by other riders, specific rides, component specifications, or the like. For example, trail x is ridden by Johnny Pro and he records his set-up (e.g., his bike geometry, components, settings, configuration information, collected telemetry data, and the like) and provides them to performance database 840, e.g., Johnny does trail x. Another rider could then request Johnny Pro's set-up (e.g., Johnny does trail x) and use that set-up information to ride trail x (or to ride other trails).

Similarly, Jackie Speed could ride her bike with specific components thereon, record her set-up (e.g., her bike geometry, components, settings, configuration information, and the like) and upload them to performance database 840. Another user with a bike having the same (or a similar) component/configuration, same bike model, brand, year, etc., would be able to request the Jackie Speed configuration as user guidance 850. In one embodiment, the received user guidance 850 would be the exact configuration used by Jackie Speed. In another embodiment, the received user guidance 850 would be a modified version of the configuration used by Jackie Speed based on the user specific user information 801. Thus, there could be information in the performance database 840 for general locations, different altitudes, specific rides, specific riders, and the like.

In one embodiment, overall data evaluator 810 would not only provide a settings update based on the location, but it is likely that a new rider would receive a first user guidance 850 with a first set of setting adjustments when they entered into the area, while an expert rider (or intermediate rider) would receive a second user guidance 850 with a second different set of setting adjustments when the entered into the same area. This differentiation of settings could also occur between bike types, e.g., a road bike entering into the area would likely (but may not necessarily) receive different user guidance 850 that that of a gravel bike, mountain bike, etc. Although experience level is used in the above example, the user guidance 850 could also be dependent upon one or more components on the bike, rider motivation, and the like.

Historical Data User Profile Builder

In one embodiment, overall data evaluator 810 could build a user specific profile such that the data received about the user would build upon any existing data such that the overall data evaluator 810 could also evaluate new data against older data to determine if the suggested changes/modifications proved better, provided no performance change, or proved worse. Further, the user specific profile could be used by FCCP 800 and further by data evaluation results formator 820 to develop a historical progression, provide feedback for different configurations, components, settings, and the like.

In one embodiment, FCCP 800 will provide a request for user feedback as part of user information 801. For example, after a ride, the user could provide user information 801 such as, but not limited to, feeling, feedback, experience, vibration, physicality (harder or easier—e.g., if the settings were changed and the same ride was repeated), performance, expectation vs. reality, comparisons (different components, different vehicles, etc.) any other comments, and the like. In one embodiment, this feedback would be included in the user specific profile, stored in performance database 840 (or the like) and used by overall data evaluator 810 when developing future user guidance 850.

In one embodiment, the collected data is presented to the user to give the user the ability to review one or more of their previous rides, to review specific portions of their previous rides, e.g., the max decline/incline angles, air-time(s), total pedal rotations, and the like, to compare different rides, and the like. The information could be provided to a user via an application on the user's mobile device, via a user's computer system display, from a web site, from an application on the user's mobile device, or the like.

For example, in one embodiment, the collected data would be used in conjunction with a mobile and computing application to illustrate the rider's and bicycle's actions via video, computer based simulations, or the like. In one embodiment, data from multiple riders can be combined to facilitate racing and comparative analysis between riders and the interaction of the connected components.

In one embodiment, a substitution of one or more components or virtual tuning of components in simulation mode will allow the customer to better understand how a specific product's tuning and/or upgrades will improve or degrade performance.

In one embodiment, FCCP 800 would manage a number of bike profiles for the user. For example, the user may have three different vehicles (a mountain bike, a road bike, and a quad). There may be different user information 801 for each of the three (or any number) of different vehicles. The user can select which vehicle she will be riding (e.g., the mountain bike), and the user guidance 850 for the mountain bike will be presented by the FCCP 800.

In one embodiment, the collected data would be provided to other manufacturers, partners, communities, and the like to further enhance the rider's experience. This data integration will be supported via FCCP 800, a specialized application to provide integration services, or the like.

Service Intervals

Figure 10C:
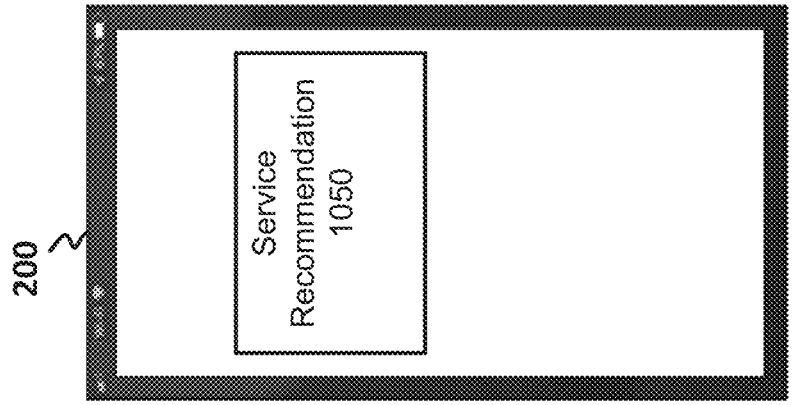
FIG. 10C is a mockup of an exemplary presentation of a vehicle and/or component service recommendation for the user and shown on a display of a computing device, in accordance with an embodiment.

In one embodiment, overall data evaluator 810 could also use the real-time and the historical user information 801 to develop or adjust service information such as service intervals, component specific service needs, and the like. Further, overall data evaluator 810 could use the received information to perform system diagnostics, provide calibration information, provide firmware updates to one or more connected components, equipment/component upgrades, and the like. As shown in FIG. 10C, in one embodiment, the service recommendation 1050 is displayed on the user's mobile device 200 in a user readable format.

In one embodiment, the service recommendations could be based on actual use versus the stock service intervals. For example, if the user is only putting 10 hours a month on the vehicle, they would not need service as often as a user putting 10 hours a week on the vehicle. In one embodiment, the service recommendations could be based on where the vehicle is used (e.g., temperature, weather, soil conditions, terrain, altitude, and the like), the vehicle storage location (e.g., garage, outside, shed, living room, etc.), vehicle component changes, and the like. Moreover, the service recommendations, equipment wear, equipment upgrades, and the like could be at the component level, at the overall vehicle level, or the like.

In one embodiment, the sensors, the mobile device, and/or the connected components would also be able to capture and provide vehicle use data such as location information, speed, ride time, angles, temperature, environment, weather, imagery of one or more parts of (or all of) the ride, etc. In one embodiment, the location of the vehicle could be provided to FCCP 800 as part of the user information 801 and user information receiver 805 could access a weather page (e.g., a weather app, web page, notam, digital service, subscription service, historical trends, forecasts, real-time, near real-time, or the like) to obtain the weather information (e.g., temperature, moisture level, and the like). In one embodiment, user information receiver 805 could access database 830 (or an Internet page, digital service, imagery, etc.) that discusses (or otherwise shows) the terrain at the location, e.g., dry, sandy, wet, dusty, fine dust, chalky, road, gravel, mud, etc. In one embodiment, user information receiver 805 could access database 830 (or an Internet page, digital service, imagery, etc.) that discusses the trail being ridden at the location, e.g., a fire road, pavement, downhill, uphill, rocky, technical, fast, lots of jumps, river/stream crossings, etc.

The captured or obtained environmental/terrain/weather data information would then be used by overall data evaluator 810 for real-time settings that can be provided as user guidance 850. In addition, the captured or obtained environmental/terrain/weather data would then be used by overall data evaluator 810 for real-time maintenance schedule changes and/or modifications that can be provided as user guidance 850. For example, if the location of the ride included a lot of water/moisture/mud, the user guidance 850 could include information or links for cleaning the vehicle (or one or more components of the vehicle).

In another example, if the location of the ride included a lot of fine dust or sand, the user guidance 850 could include updated maintenance requirements or (preventive maintenance requirements) for the vehicle (or one or more components of the vehicle). For example, if the cranks are to be maintained annually, a lot of time in fine sand could result in a need for an earlier cleaning/overhaul.

In one embodiment, the maintenance schedule changes and/or modifications suggested by overall data evaluator 810 could be based on all of the vehicle data. For example, if the bike has been ridden on a steep trail once or twice in total (of once or twice a month) there would likely be no need for any maintenance schedule changes and/or modifications. In contrast, if the bike has been ridden on the steep trail once or twice a week for the past 6 weeks, overall data evaluator 810 would determine that there would likely be a need for maintenance schedule changes and/or modifications to one or more of the components on the bike. Similar determinations could be made based on the history of rides in dust/silt, history of rides in the rain or wet environments, history of rides at a high altitude, etc.)

Thus, based on the historical vehicle use data, overall data evaluator 810 would be able to establish the appropriate recommended maintenance schedule. For example, in one embodiment, the historical vehicle data would be useful in establishing the appropriate maintenance schedule based on the amount of use of the vehicle (e.g., daily rider, weekly rider, hours ridden a week, month, etc.). That is, a vehicle used more often may have a different recommended maintenance schedule than a vehicle that is used less often. In addition, the historical vehicle data would be useful in establishing the appropriate maintenance schedule based on the normal use of the vehicle, (e.g., use location, type, amount, terrain, weather, temperature, etc.). In one embodiment, the maintenance schedule could be for the suspension components. Further, by maintaining the historical record, a single ride or a few rides in an unusual environment would not likely facilitate a need for maintenance schedule changes and/or modifications. However, after a certain number of rides (or hours ridden) in an unusual environment would likely facilitate the need for maintenance schedule changes and/or modifications.

In one embodiment, the service information could be provided to the user (such as on the mobile display, through the application, a computer system, a web-based presentation, or the like) which could include a link to make a component purchase, schedule a tune-up, make a parts purchase (e.g., O-rings, bearings, grease, seals, chain, and the like.), offer discounts, coupons, provide links to service videos, links to virtual websites that will provide a view of what new component(s) will look like (or how they will perform, etc.), and the like.

Post Ride Evaluation

In one embodiment, overall data evaluator 810 will evaluate the performance data collected during the ride. That is, based on the sensor information obtained by the sensors during the ride, the rider will receive "personalized riding coach" riding tips and performance enhancing suggestions.

For example, the FCCP 800 would review the sensor data (along with the actual bike's actual performance characteristics and capabilities). Using this information, the "riding coach" FCCP 800 would be able to evaluate the rider's personal performance along with the actual performance of one or more of the connected components on the vehicle. This would allow the FCCP 800 to determine if the rider is obtaining the maximum performance from a component, if the component needs maintenance, if it is time for preventative maintenance, replacement, etc. For example, in evaluating the rider's personal performance, the FCCP 800 would be able to evaluate a ride (or a portion of a ride) to determine where the rider could have pushed harder, braked later, shifted to a different (lower or higher) gear, different (harder or softer) damper settings, or the like.

Similarly, the FCCP 800 would be able to complement a rider on their personal performance aspects (e.g., "your downhill was in the top 25% of all recorded users (or a set of designated users, or a collection of the rider's own rides, etc.)). The FCCP 800 could also suggest replacement components where the suggestion could be tailored by best performance gains, best bang-for-buck, best component based on other existing components, etc. Thus, the rider would not simply be provided with a purchase offer, but the rider would be provided with a customized, individualized, and specific component(s) guide that is matched to the rider's individual riding style, body type, skill level, etc. Thus, instead of selecting in the dark, using online forums, bike shops, or the like; the rider would be provided with a number of specifications (or actual brand components) that would meet the rider's personal criteria. For example, a 150 lb rider looking for a replacement fork would be provided with one or more fork options that are taken from the actual rider and rider style specifications; e.g., a 140-160 lbs rider weight, strong (or lightweight or combination), terrain type (e.g., road, dirt, gravel, mountain terrain), environment (e.g., sandy, day, water, mud, dry), amount of use, etc.

Because of the growing capabilities of connected components, active suspension systems, and sensor generated feedback; the ability to provide a rider with a personalized professional level of support, settings, maintenance, and guidance is at a previously untenable level. What would have previously required a team of experts is now capable of being provided by the FCCP 800.

For example, overall data evaluator 810 will compare the settings used on the ride with the actual performance of the vehicle and/or components thereon. In one embodiment, the post-ride evaluation would determine if the settings used were the most appropriate for the ride, if one or more aspects of the suggested settings should be adjusted for performance gains, if the connected components were operating correctly, if any faults were detected, or the like.

For example, in the post-ride evaluation it may be determined that one or more downhill settings did not allow for the full motion of one or more components. In one embodiment, the post-ride evaluation could determine that the downhill settings were too stiff and that a softer settings would have allowed for additional performance to be obtained from the vehicle or one or more components thereon. In another embodiment, the post-ride evaluation could determine that one or more of the connected components was not operating correctly and needed an update, repair, replacement, or the like.

In one embodiment, if the post-ride evaluation determines that the user guidance 850 was not correct for the situation, the result of the post-ride evaluation would be an adjustment to one or more components in the user guidance 850. In one embodiment, if the same adjustment was needed for the same rider on a number of different rides, there may be further input such as rider weight, height, seat settings, and the like that could be added to the user information 801 and then used to refine some portion of the evaluation performed by overall data evaluator 810.

Moreover, if the same adjustments were determined to be necessary for a number of riders (each of which being shorter than 5'7") that height information could be added to performance database 840 such that overall data evaluator 810 would make further guidance suggestions when the height was provided by the rider. Although height is discussed, the recurring feature could be, on or a combination of, rider height, weight, gender, age, body mass, body type, fitness level, heart rate, seat height setting, seat pitch, seat offset, crank arm length, wheel diameter, handlebar width, handlebar offset (fore or aft), pedal type, bike model, bike model year, etc. Further, some or all of the above information could be obtained by user input, by communication between the user's mobile device 200 and networked devices such as a smart scale, smart watch or other smart jewelry that monitors one or more user's biometrics (e.g., heart rate, body mass, temperature, etc.); and the like.

In one embodiment, the collected data would be provided to other manufacturers, partners, communities, and the like to further enhance the rider's experience. This data integration will be supported via the FCCP or a specialized application to provide integration services.

Increased Active Suspension Battery Life and Computer Performance

In one embodiment, the computing system running the FCCP 800 application and the different connected capabilities of the active suspension system utilize more or less of the data from the different data sources (instead of all of the myriads of sensor, rider, vehicle, terrain, environment, data) to generate and define the results, settings, evaluations, and conclusions. In so doing, instead of using, evaluating, and implementing the data, settings, and setup using the limited computing resources and battery power of the suspension controller, the device (or devices) running the FCCP 800 disseminate an amount of processing based on different components computing capabilities, energy requirements, etc. For example, the FCCP 800 allows the users laptop (desktop, notebook, mobile device, or other higher processing/storage/energy computing system) to do a lot of the processing while providing only light processing requirements to be performed by the battery powered controller. Thereby refining the overall computer processing and data storage capability, while reducing processor usage, energy requirements, memory requirements, and the like.

For example, by generating a tune (with a number of predefined parameters), the processing, storage, and battery requirements of one or more of the active suspension components (including the suspension controller) are reduced. For example, the tune includes a number of parameters with a number of thresholds. In the case of a bump, the tune defines a magnitude that can differ based on terrain (e.g., paved road low magnitude—e.g., 2 cm bump; gravel road medium magnitude—e.g., 5 cm bump; etc.). Thus, the sensor information is evaluated for the size of the bump on the given surface and when it exceeds the threshold (as defined by the tune stored in the controller), the change is automatically made (e.g., hard to soft suspension setting, or the like). As such, the processing requirements for the suspension controller portion of the active suspension are supported by the user's mobile device running the FCCP 800 application (for example). In so doing, the battery usage of the suspension controller and other smart systems of the active suspension are reduced from an entire evaluation of all real-time sensor information, terrain information, etc. (which is now being performed by the FCCP 800), to the significantly less computer intensive bump threshold evaluation.

By reducing the processing requirements of battery supported components, the operational time for the active suspension system between charges can be increased, the weight of one or more of the active suspension system components can be decreased, and the overall user enjoyment is maintained (or enhanced) since the active suspension system is providing a personalized customer performance and is not running out of charge halfway through a ride—but instead remains fully functional during an entire ride, a day of riding, etc.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. A system comprising:
   a memory;
   at least one processor configured to:
      initiate a connected component platform (CCP) application;
      receive information about at least one connected component on a vehicle;
      receive a sensor derived performance information for said vehicle; and
      develop, at said CCP application, a suspension setup recommendation for said vehicle based on said information about said at least one connected component and said sensor derived performance information;
   a display to present said suspension setup recommendation for said vehicle wherein said at least one processor is further configured to:
      receive user specific information selected from the group consisting of: a static user information and a dynamic user information;
      update, at said CCP application, said suspension setup recommendation for said vehicle based on said user specific information;
      receive historical performance data for said at least one connected component;
      evaluate said sensor derived performance information for said vehicle in light of said information about said at least one connected component and said historical performance data in conjunction with said user specific information;
      develop a personalized performance review of an actual performance of said at least one connected component based on a result of said evaluation; and
      update, at said CCP application, said suspension setup recommendation for said vehicle based on said personalized performance review.

2. The system of claim 1 further comprising:
   a communication system to:
      communicate with at least one sensor to obtain said sensor derived performance information for said vehicle; and
   said memory to store said sensor derived performance information for said vehicle.

3. The system of claim 1 wherein said information about said at least one connected component is a product specification for said at least one connected component.

4. The system of claim 1 wherein said static user information comprises:
   physical information about a user.

5. The system of claim 1 wherein said static user information comprises:
   skill level information about a user.

6. The system of claim 1 wherein said static user information comprises:
   a make and model of said vehicle.

7. The system of claim 1 wherein said static user information comprises:
   a use type for said vehicle.

8. The system of claim 1 wherein said static user information comprises:
   a geometry of said vehicle.

9. The system of claim 1 wherein said dynamic user information comprises:
   information for an area of real time operation of said vehicle, the information selected from the group consisting of a location, an elevation, a terrain type, and a weather report.

10. The system of claim 1 wherein said at least one processor is configured to:
    receive, from said memory, a suspension maintenance requirement for said at least one connected component;
    evaluate said sensor derived performance information in light of said suspension maintenance requirement; and
    update, at said memory, said suspension maintenance requirement of said at least one connected component based on a result of said evaluation.

11. A system comprising:
    at least one connected component on a vehicle;
    at least one sensor to monitor a performance aspect of said vehicle;
    a mobile computing device, said mobile computing device comprising:
       a memory; and
       at least one processor to:
          initiate a connected component platform (CCP) application;
          receive information about said at least one connected component;
          receive a sensor derived performance information for said vehicle; and
          develop, at said CCP application, a suspension setup recommendation for said vehicle based on said information about said at least one connected component and said sensor derived performance information; and
    a display to present said suspension setup recommendation for said vehicle;

wherein said at least one processor is further configured to:
- receive user specific information selected from the group consisting of: a static user information and a dynamic user information;
- update, at said CCP application, said suspension setup recommendation for said vehicle based on said user specific information;
- receive historical performance data for said at least one connected component;
- evaluate said sensor derived performance information for said vehicle in light of information about said at least one connected component and said historical performance data in conjunction with said user specific information;
- develop a personalized performance review of an actual performance of said at least one connected component based on a result of said evaluation; and
- update, at said CCP application, said suspension setup recommendation for said vehicle based on said personalized performance review.

12. The system of claim 11 wherein said at least one sensor monitors said performance of said at least one connected component.

13. The system of claim 11 further comprising:
said at least one connected component is an active suspension of said vehicle; and
a suspension controller to:
receive said suspension setup recommendation for said vehicle from said CCP application; and
automatically implement said suspension setup recommendation on said active suspension.

14. The system of claim 13 further comprising:
said at least one processor configured to:
- repeatedly receive real-time said sensor derived performance information for said vehicle from said at least one sensor; and
- repeatedly update, at said CCP application, said suspension setup recommendation for said vehicle based on said repeatedly received real-time said sensor derived performance information for said vehicle; and said suspension controller to:
- receive said repeatedly updated suspension setup recommendation for said vehicle from said CCP application; and
- automatically implement at least one said repeatedly updated suspension setup recommendation on said active suspension.

15. The system of claim 11 further comprising:
a communication system to:
communicate with at least one sensor to obtain said sensor derived performance information for said vehicle; and
said memory to store said sensor derived performance information for said vehicle.

16. The system of claim 11 wherein said information about said at least one connected component is a product specification for said at least one connected component.

17. The system of claim 11 wherein said static user information comprises:
physical information about a user; and
skill level information about said user.

18. The system of claim 11 wherein said static user information comprises:
a make and model of said vehicle.

19. The system of claim 11 wherein said static user information comprises:
a use type for said vehicle; and
a geometry of said vehicle.

20. The system of claim 11 wherein said dynamic user information comprises:
information for an area of real time operation of said vehicle, the information selected from the group consisting of a location, an elevation, a terrain type, and a weather report.

21. The system of claim 11 wherein said at least one processor is configured to:
receive, from said memory, a suspension maintenance requirement for said at least one connected component;
evaluate said sensor derived performance information in light of said suspension maintenance requirement; and
update, at said memory, said suspension maintenance requirement of said at least one connected component based on a result of said evaluation.

* * * * *